(12) United States Patent
Li et al.

(10) Patent No.: US 12,621,280 B2
(45) Date of Patent: May 5, 2026

(54) COMMUNICATION METHOD AND APPARATUS

(71) Applicant: HUAWEI TECHNOLOGIES CO., LTD., Shenzhen (CN)

(72) Inventors: He Li, Shanghai (CN); Ao Lei, Beijing (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 18/452,575

(22) Filed: Aug. 21, 2023

(65) Prior Publication Data

US 2024/0214365 A1 Jun. 27, 2024

Related U.S. Application Data

(63) Continuation of application No. PCT/CN2022/076667, filed on Feb. 17, 2022.

(30) Foreign Application Priority Data

Feb. 21, 2021 (CN) .......................... 202110194700.9

(51) Int. Cl.
*H04L 9/40* (2022.01)

(52) U.S. Cl.
CPC .................................... *H04L 63/08* (2013.01)

(58) Field of Classification Search
CPC ......... H04L 9/0891; H04L 63/08; H04L 9/40; H04L 12/4633; H04L 41/0893; H04L 63/0876; H04L 2209/80; H04W 12/06; H04W 12/121; H04W 12/082; H04W 12/69; H04W 12/069; H04W 12/122; H04W 12/08; B64U 2201/20
See application file for complete search history.

(56) References Cited

U.S. PATENT DOCUMENTS

2016/0371987 A1* 12/2016 Kotecha ................... G08G 5/26

FOREIGN PATENT DOCUMENTS

| CN | 102263793 A | 11/2011 |
| CN | 108769394 A | 11/2018 |
| CN | 110838245 A | 2/2020 |

(Continued)

OTHER PUBLICATIONS

EPO Espacenet—Machine translation of Chinese Patent Document CN111757419A (Year: 2020).*

(Continued)

*Primary Examiner* — Benjamin A Kaplan

(57) ABSTRACT

This application provides a communication method and apparatus. The method includes: A first network element receives a first request message from a second network element, where the first request message is used to request to perform a first operation on a first terminal device. The first network element determines, based on the first request message, whether the second network element is authorized to request to perform the first operation on the first terminal device. Whether a network element that sends a request message is authorized to request to perform a related operation is verified, to determine whether the network element is an attacker. This reduces impact on a system service resulting from requests of an attacker and improves system security.

20 Claims, 13 Drawing Sheets

(56)                References Cited

FOREIGN PATENT DOCUMENTS

CN          111757419 A      10/2020

OTHER PUBLICATIONS

3rd Generation Partnership Project;Technical Specification Group Core Network and Terminals;5G System;Interworking between 5G Network and external Data Networks;Stage 3 (Release 17),3GPP TS 29.561 V17.0.0 (Dec. 2020), total:72pages.
3rd Generation Partnership Project;Technical Specification Group Service and System Aspects;Security Assurance Specification (SCAS) for the Network Slice-Specific Authentication and Authorization Function (NSSAAF) networkproduct class; (Release 17),3GPP TS 33.326 V0.1.0 (Nov. 2020),total:8pages.
3GPP TR 23.754 V17.0.0 (Dec. 2020),3rd Generation Partnership Project;Technical Specification Group Services and System Aspects;Study on supporting Unmanned Aerial Systems (UAS) connectivity, Identification and tracking (Release 17),total 139 pages.
3GPP TS 33.501 V17.0.0 (Dec. 2020), 3rd Generation Partnership Project;Technical Specification Group Services and System Aspects;Security architecture and procedures for 5G system(Release 17),total 253 pages.
3GPP TS 23.502 V16.7.1 (Jan. 2021),3rd Generation Partnership Project;Technical Specification Group Services and System Aspects;Procedures for the 5G System (5GS);Stage 2(Release 16),total 597 pages.
3GPP TR33.854 V0.4.0(Jan. 2021),3rd Generation Partnership Project;Technical Specification Group Services and System Aspects; Study on security aspects of Unmanned Aerial Systems (UAS) (Release 17),total 11 pages.
3GPP TSG SA WG3 #102e S3-210198, Serving network name in NSSAA,Huawei,et al.,Jan. 18-29, 2020,total 13 pages.

* cited by examiner

100

600

700

800

1000

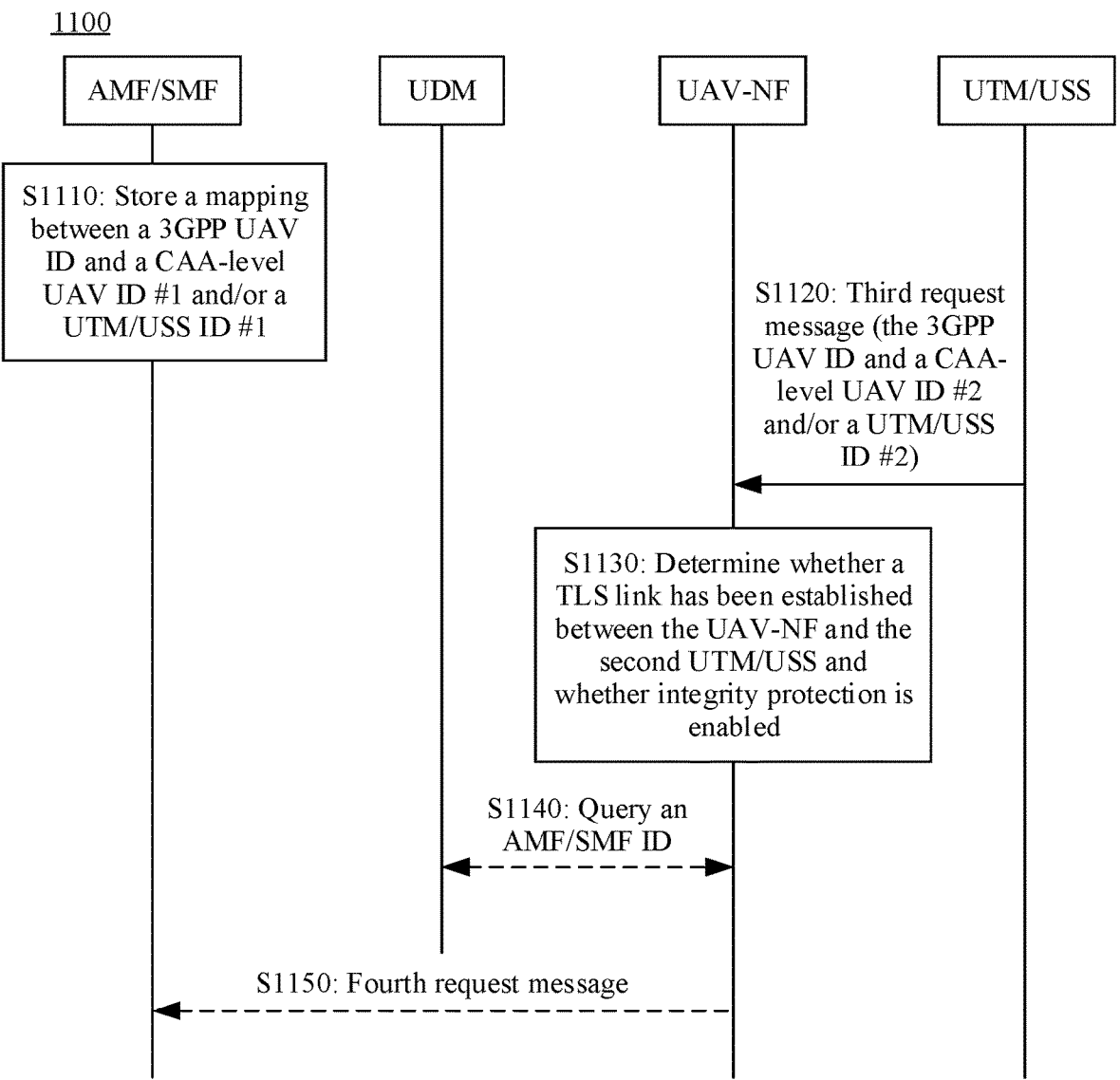

1100

AMF/SMF        UDM        UAV-NF        UTM/USS

S1110: Store a mapping
between a 3GPP UAV
ID and a CAA-level
UAV ID #1 and/or a
UTM/USS ID #1

S1120: Third request
message (the 3GPP
UAV ID and a CAA-
level UAV ID #2
and/or a UTM/USS
ID #2)

S1130: Determine whether a
TLS link has been established
between the UAV-NF and the
second UTM/USS and
whether integrity protection is
enabled S1140: Query an
AMF/SMF ID S1150: Fourth request message

FIG. 11

COMMUNICATION METHOD AND APPARATUS

CROSS-REFERENCE TO RELATED APPLICATIONS

This application is a continuation of International Application No. PCT/CN2022/076667, filed on Feb. 17, 2022, which claims priority to Chinese Patent Application No. 202110194700.9, filed on Feb. 21, 2021. The disclosures of the aforementioned applications are hereby incorporated by reference in their entireties.

TECHNICAL FIELD

This application relates to the communication field, and more specifically, to a communication method and apparatus.

BACKGROUND

In some scenarios, attackers may request to perform some operations on another communication apparatus by masquerading an identity. For example, after an authentication procedure between a terminal device and a network slice is completed, attackers may masquerade as an authentication, authorization, and accounting server (authentication, authorization, and accounting server, AAA-S) to request re-authentication or request authentication revocation from a network slice-authentication and authorization function (network slice-specific authentication and authorization function, NSSAAF). For another example, after an uncrewed aerial vehicle authentication and authorization procedure, attackers may masquerade as an uncrewed aerial system traffic management (uncrewed aerial system traffic management, UTM)/unmanned aerial system service supplier (unmanned aerial system service supplier, USS) to request to revoke authentication and authorization from a network element having an uncrewed aerial vehicle function (for example, an uncrewed aerial vehicle network function (uncrewed aerial vehicle network function, UAV-NF)). This severely affects communication security. Therefore, a technology is desired to improve communication security.

SUMMARY

A communication method and apparatus in embodiments of this application can improve communication security.

According to a first aspect, a communication method is provided. The method includes: A first network element receives a first request message from a second network element, where the first request message is used to request to perform a first operation on a first terminal device. The first network element determines, based on the first request message, whether the second network element is authorized to request to perform the first operation on the first terminal device.

For example, the second network element requests the first network element to perform an operation on another communication device. For example, the second network element requests the first network element to perform the first operation on the first terminal device.

In an example, in a network slice scenario, the second network element is, for example, an AAA-S; the first network element is, for example, an NSSAAF; the first terminal device is, for example, a user equipment UE; and the first operation is, for example, network slice-specific re-authentication. To be specific, the AAA-S sends the first request message to the NSSAAF, to request to perform network slice-specific re-authentication on the UE. The first operation includes the network slice-specific re-authentication or network slice-specific authentication revocation.

In another example, in an uncrewed aerial vehicle scenario, the second network element is, for example, a UTM; the first network element is, for example, a UAV-NF; the first terminal device is, for example, a UAV; and the first operation is, for example, uncrewed aerial vehicle authentication and authorization revocation. To be specific, the UTM sends the first request message to the UAV-NF, to request to perform an operation of revoking uncrewed aerial vehicle authentication and authorization on the UAV. The first operation includes authentication and authorization revocation or pairing authentication and authorization revocation.

Therefore, according to the communication method in this embodiment of this application, whether a network element that sends a request message is authorized to request to perform a related operation is verified, to determine whether the network element is a malicious attacker. This reduces impact on a system service resulting from requests of an attacker and improves system security.

It should be understood that, that the second network element requests, via the first request message, the first network element to perform the first operation on the first terminal device may be understood as that the second network element requests, via the first request message, to perform the first operation on all parameters that are related to a first request and that are used by the first terminal device, or the second network element requests, via the first request message, to perform the first operation on a parameter that is related to a first request and that is used by the first terminal device. For example, in a network slice scenario, a first control device is, for example, an AAA-S; a first communication apparatus is, for example, an NSSAAF; the first terminal device is, for example, a user equipment UE; a parameter corresponding to the UE is at least one piece of S-NSSAI; and the first operation is, for example, network slice-specific re-authentication. To be specific, the AAA-S sends the first request message to the NSSAAF, to request to perform network slice-specific re-authentication on network slices corresponding to all pieces of S-NSSAI of the UE, or the AAA-S sends the first request message to the NSSAAF, to request to perform network slice-specific re-authentication on a network slice corresponding to one piece of S-NSSAI of the UE.

With reference to the first aspect, in some implementations of the first aspect, the first request message includes a first identifier and a second identifier, the first identifier is associated with the first terminal device, and the second identifier is associated with the second network element.

That the first identifier and the second identifier are used to verify whether the second network element is authorized to perform the first operation on the first terminal device may be understood as that the first identifier and the second identifier are used to verify whether the second network element has an association relationship with the first identifier.

It should be understood that the first identifier associated with the first terminal device may be an identifier for identifying an identity of the first terminal device, or may be a service identifier for the first terminal device. The second identifier associated with the second network element may be information for identifying the second network element, for example, address information or identity information of the second network element, or may be information associated with a service of the second network element. The information needs to be information that cannot be obtained by attackers. Therefore, whether an identity of the second network element is correct may be verified in a manner of verifying the second identifier associated with the second network element, to improve system security.

With reference to the first aspect, in some implementations of the first aspect, the second identifier includes at least one of the following information: the identity ID of the second network element, an internet protocol IP address of the second network element, and a fully qualified domain name FQDN of the second network element; and the first identifier includes single network slice selection assistance information S-NSSAI. It should be understood that the second identifier in this implementation may be combined with the example in the foregoing slice scenario.

With reference to the first aspect, in some implementations of the first aspect, the second identifier includes at least one of the following information: the identity ID of the second network element, and a civil aviation authority level uncrewed aerial vehicle identifier of the first terminal device; and the first identifier includes the identity ID of the first terminal device. It should be understood that the second identifier in this implementation may be combined with the example in the foregoing uncrewed aerial vehicle scenario.

With reference to the first aspect, in some implementations of the first aspect, the method further includes: The first network element stores a mapping between a third identifier and the first identifier. That the first network element determines, based on the first request message, whether the second network element is authorized to perform the first operation on the first terminal device includes: The first network element obtains the mapping based on the first identifier; when the second identifier matches the third identifier, the first network element determines that the second network element is authorized to request to perform the first operation on the first terminal device; or when the second identifier does not match the third identifier, the first network element determines that the second network element is not authorized to perform the first operation on the first terminal device.

It should be understood that the mapping indicates a valid association relationship. Specifically, the mapping may be used to obtain a valid associated object (for example, an FQDN or an IP address) of the first identifier. The mapping is used to indicate the valid associated object, for example, the third identifier. A corresponding network element is authorized to perform the first operation on the first terminal device. A network element corresponding to an identifier that is the same as the valid associated object is authorized to perform the first operation on the first terminal device.

It should be noted that, that the second identifier matches the third identifier indicates that the second identifier is the same as the third identifier, or an identifier that is the same as the second identifier may be based on the third identifier. For example, the second identifier is an IP address #1 of the second network element, and the third identifier is an IP address #2 of a third network element. When the IP address #1 is the same as the IP address #2, it indicates that the second identifier matches the third identifier; or when the IP address #1 is not the same as the IP address #2, it indicates that the second identifier does not match the third identifier. For another example, the second identifier is an IP address #1 of the second network element, the third identifier is an FQDN of a third network element, and the first network element determines an IP address #2 of the third network element based on the FQDN. When the IP address #1 is the same as the IP address #2, it indicates that the second identifier matches the third identifier; or when the IP address #1 is not the same as the IP address #2, it indicates that the second identifier does not match the third identifier.

When the first network element determines that the second network element is authorized to request to perform the first operation on the first terminal device, the first network element performs a procedure of the first operation on the first terminal device based on the first request message. When the first network element determines that the second network element is not authorized to request to perform the first operation on the first terminal device, the first network element terminates a procedure of the first operation. Specifically, for example, the first network element ignores or discards the first request message, or the first network element sends a response message to the second network element, where the response message is used to reject the first request message.

It should be understood that the first network element may be preconfigured with mappings between a plurality of identifiers associated with a plurality of control devices and a plurality of identifiers associated with a plurality of terminal devices in a system, or may locally store mappings between a plurality of identifiers associated with a plurality of control devices and a plurality of identifiers associated with a plurality of terminal devices after determining the mapping based on another related identifier in a system.

It should be understood that, that an attribute of the third identifier is the same as that of the second identifier indicates that the third identifier and the second identifier are identifiers of a same type. For example, if both the third identifier and the second identifier are IP addresses, the third identifier is an IP address of the third network element, and the second identifier is the IP address of the second network element.

With reference to the first aspect, in some implementations of the first aspect, the first operation includes the network slice-specific re-authentication or the network slice-specific authentication revocation.

Therefore, the communication method in this embodiment of this application can improve security in a network slice-specific re-authentication scenario, that is, reduce repeated re-authentication or authentication revocation between a terminal device and a network slice resulting from requests of an attacker.

With reference to the first aspect, in some implementations of the first aspect, the first operation includes authentication and authorization revocation or pairing authentication and authorization revocation.

Therefore, the communication method in this embodiment of this application can improve security in the uncrewed aerial vehicle scenario, that is, reduce cases in which authentication and authorization for an uncrewed aerial vehicle are revoked resulting from requests of an attacker.

With reference to the first aspect, in some implementations of the first aspect, the method further includes: The first network element obtains timestamp information, where the timestamp information indicates valid time of the second identifier.

To be specific, the second identifier is bound to the timestamp information, the timestamp information indicates the valid time, and the first network element deletes the second identifier after the valid time expires. Therefore, a case in which verification fails because identification information is invalid can be avoided, improving system security.

With reference to the first aspect, in some implementations of the first aspect, before that a first network element receives a first request message from a second network element, the method further includes: The first network element establishes a security link to the second network element.

The establishing a security link may include: during network establishment, establishing the security link to the second network element by the first network element based on a device pre-configuration or manual triggering, establishing the security link when the first network element and the second network element communicate with a peer end for the first time, or establishing the security link when the first network element and the second network element communicate with the peer end again. The difference lies in that the establishing of the security link to the second network element by the first network element for the first time is a link establishment procedure initiated by the first network element. For example, in an NSSAA procedure, the first network element initiates a procedure of establishing the security link to the second network element. However, a process of establishing the security link again may be initiated by the second network element. For example, in a network slice-specific re-authentication procedure, the second network element initiates a procedure of establishing the security link to the first network element.

With reference to the first aspect, in some implementations of the first aspect, that the first network element establishes a security link to the second network element includes: The first network element obtains security certificate information of the second network element; and the first network element establishes an internet protocol security IPsec tunnel with the second network element based on the security certificate information.

With reference to the first aspect, in some implementations of the first aspect, that the first communication apparatus establishes a security link to the second control device includes: The first network element obtains security certificate information of the second network element; and the first network element establishes a transport layer security TLS protocol/datagram transport layer security DTLS protocol link to the second network element based on the security certificate information.

The first network element stores a fourth identifier during establishment of the security link or after establishment of the security link, where the fourth identifier is associated with the second network element and the security link. It should be understood that, that the fourth identifier is associated with the second network element and the security link may be understood as that the fourth identifier is a security-protected and provable identifier that is associated with the second network element. For example, the first network element obtains a security certificate of the second network element from a security link establishment process, and obtains the fourth identifier from the security certificate of the second network element. Alternatively, the fourth identifier is associated with an identifier of the security link. Therefore, it may be considered that the fourth identifier is an authentic and intact identifier associated with the second network element.

The first network element receives the first request message from the second network element through the security link, and obtains the second identifier from the first request message. When the first network element determines that the second identifier is the same as the fourth identifier, the first network element continues to perform a current procedure. When the first network element determines that the second identifier is different from the fourth identifier, the first network element terminates the procedure. For example, the first network element ignores or discards the first request message, or the first network element sends a response message to the second network element, where the response message is used to reject the first request message.

The first network element receives the first request message from the second network element through the security link, and obtains the first identifier from the first request message. When the first network element determines that the third identifier associated with the first identifier or a mapping corresponding to the third identifier is the same as the fourth identifier, the first network element continues to perform a current procedure. When the first network element determines that the third identifier is different from the fourth identifier, the first network element terminates the procedure. For example, the first network element ignores or discards the first request message, or the first network element sends a response message to the second network element, where the response message is used to reject the first request message.

According to a second aspect, a communication method is provided. The method includes: A second network element generates a first request message; and the second network element sends the first request message to a first network element, where the first request message is used to request to perform a first operation on a first terminal device, and the first request message is used to determine whether the second network element is authorized to request to perform the first operation on the first terminal device.

With reference to the second aspect, in some implementations of the second aspect, a second identifier includes at least one of the following information: an identity ID of the second network element, an internet protocol IP address of the second network element, and a fully qualified domain name FQDN of the second network element; and a first identifier includes single network slice selection assistance information S-NSSAI.

With reference to the second aspect, in some implementations of the second aspect, a second identifier includes at least one of the following information: an identity ID of the second network element, and a civil aviation authority level uncrewed aerial vehicle identifier of the first terminal device; and a first identifier includes an identity ID of the first terminal device.

With reference to the second aspect, in some implementations of the second aspect, the first operation includes network slice-specific re-authentication or network slice-specific authentication revocation.

With reference to the second aspect, in some implementations of the second aspect, the first operation includes authentication and authorization revocation for the first terminal device or pairing authentication and authorization revocation for the first terminal device.

With reference to the second aspect, in some implementations of the second aspect, before that the second network element sends the first request message to a first network element, the method further includes: The second network element establishes a security link to the first network element. That the second network element sends the first request message to a first network element includes: The second network element sends the first request message to the first network element through the security link.

The establishing a security link may include: during network establishment, establishing the security link to the second network element by the first network element based on a device pre-configuration or manual triggering, establishing the security link when the first network element and the second network element communicate with a peer end for the first time, or establishing the security link when the first network element and the second network element communicate with the peer end again. The difference lies in that the establishing of the security link to the second network element by the first network element for the first time is a link establishment procedure initiated by the first network element. For example, in an NSSAA procedure, the first network element initiates a procedure of establishing the security link to the second network element. However, a process of establishing the security link again may be initiated by the second network element. For example, in a network slice-specific re-authentication procedure, the second network element initiates a procedure of establishing the security link to the first network element.

With reference to the second aspect, in some implementations of the second aspect, that the second network element establishes a security link to the first network element includes: The second network element sends security certificate information of the second network element to the first network element; and the second network element establishes an internet protocol security IPsec tunnel with the first network element based on the security certificate information.

With reference to the second aspect, in some implementations of the second aspect, that the second network element establishes a security link to the first network element includes: The second network element sends security certificate information of the second network element to the first network element; and the second network element establishes a transport layer security TLS protocol/datagram transport layer security DTLS protocol link to the first network element based on the security certificate information.

According to a third aspect, a communication method is provided. The method includes: A first network element receives a first request message from a second network element, where the first request message is used to request to perform network slice-specific re-authentication or network slice-specific authentication revocation on a first terminal device; and the first network element determines, based on the first request message, whether the second network element is authorized to request to perform network slice-specific re-authentication or network slice-specific authentication revocation on the first terminal device.

With reference to the third aspect, in some implementations of the third aspect, the first request message includes a first identifier and a second identifier, the first identifier is associated with the first terminal device, the second identifier is associated with the second network element, and the first identifier and the second identifier are used to determine whether the second network element is authorized to request to perform network slice-specific re-authentication or network slice-specific authentication revocation on the first terminal device.

With reference to the third aspect, in some implementations of the third aspect, the second identifier includes at least one of the following information: an identity ID of the second network element, an internet protocol IP address of the second network element, and a fully qualified domain name FQDN of the second network element; and the first identifier includes single network slice selection assistance information S-NSSAI.

With reference to the third aspect, in some implementations of the third aspect, the first network element includes an NSSAAF, the second network element includes an AAA-S, and the first terminal device includes user equipment UE.

With reference to the third aspect, in some implementations of the third aspect, the method further includes: The first network element obtains security certificate information of the second network element; and the first network element establishes an internet protocol security IPsec tunnel with the second network element based on the security certificate information.

Therefore, according to the communication method provided in this embodiment of this application, the first request message sent by the AAA-S to the NSSAAF carries address information and/or identity information of the AAA-S, and the address information and/or the identity information of the AAA-S is verified to determine whether an identity of the AAA-S is correct. This reduces repeated re-authentication or authentication revocation between a terminal device and a network slice resulting from requests of an attacker.

According to a fourth aspect, a communication method is provided. The method includes: A first network element receives a first request message from a second network element, where the first request message is used to request to perform authentication and authorization revocation/pairing authentication and authorization revocation on a first terminal device; and the first network element determines, based on the first request message, whether the second network element is authorized to request to perform authentication and authorization revocation/pairing authentication and authorization revocation on the first terminal device.

With reference to the fourth aspect, in some implementations of the fourth aspect, the first request message includes a first identifier and a second identifier, the first identifier is associated with the first terminal device, the second identifier is associated with the first terminal device or the second network element, and the first identifier and the second identifier are used to determine whether the second network element is authorized to request to perform authentication and authorization revocation/pairing authentication and authorization revocation on the first terminal device.

With reference to the fourth aspect, in some implementations of the fourth aspect, the second identifier includes at least one of the following information: an identity ID of the second network element, and a civil aviation authority level uncrewed aerial vehicle identifier CAA-level UAV ID of the first terminal device; and the first identifier includes an identity ID of the first terminal device.

With reference to the fourth aspect, in some implementations of the fourth aspect, the first network element includes a UAV-NF or an AAA-P, the second network element includes a UTM/USS, and the first terminal device includes a UAV.

With reference to the fourth aspect, in some implementations of the fourth aspect, the method further includes: The first network element obtains security certificate information of the second network element; and the first network element establishes a transport layer security TLS protocol link or a datagram transport layer security DTLS protocol link to the second network element based on the security certificate information.

Therefore, according to the communication method provided in this embodiment of this application, the first request message sent by the UTM/USS to the UAV-NF carries the CAA-level UAV ID and/or a UTM/USS ID, and the CAA-level UAV ID and/or the UTM/USS ID are/is verified to determine whether an identity of the UTM/USS is correct. This reduces cases in which authentication and authorization for an uncrewed aerial vehicle is revoked resulting from requests of an attacker. To be specific, according to the communication method provided in this embodiment of this application, the UAV-NF is allowed to detect whether the identity of the UTM/USS that sends an authentication and authorization revocation request is correct, that is, detect whether the UTM/USS is an authorized UTM/USS. This reduces the cases in which the authentication and authorization for the uncrewed aerial vehicle is unexpectedly revoked resulting from requests of an attacker, and improves system security.

According to a fifth aspect, a communication method is provided. The method includes: A first network element receives a first request message from a second network element, where the first request message is used to request to perform authentication and authorization revocation/pairing authentication and authorization revocation on a first terminal device; the first network element determines whether a security link is established to the second network element and whether integrity protection is enabled; and when the security link is established between the first network element and the second network element and the integrity protection is enabled, the first network element determines, based on the first request message, whether the second network element is authorized to request to perform authentication and authorization revocation/pairing authentication and authorization revocation on the first terminal device.

With reference to the fifth aspect, in some implementations of the fifth aspect, the first network element includes a UAV-NF or an AAA-P, the second network element includes a UTM/USS, and the first terminal device includes a UAV.

With reference to the fifth aspect, in some implementations of the fifth aspect, the method further includes: The UAV-NF obtains identification information of the UTM/USS and identification information of a TLS link in a process of establishing the TLS link to the UTM/USS, and stores an association relationship between an identifier of the TLS link and the identification information of the UTM/USS after successfully establishing the TLS link to the UTM/USS. After receiving, through the TLS link, the first request message for authentication and authorization revocation/pairing authentication and authorization revocation sent by the UTM/USS, the UAV-NF obtains the identification information of the UTM/USS based on the identifier of the TLS link and performs verification to determine whether an identity of the UTM/USS is correct. This reduces cases in which authentication and authorization for an uncrewed aerial vehicle are revoked resulting from requests of an attacker. The establishing a TLS link may include: during network establishment, establishing the TLS link to the UTM/USS by the UAV-NF based on a device pre-configuration or manual triggering, establishing the TLS link when the UTM/USS and the UAV-NF communicate with a peer end for the first time, or establishing the security link when the UTM/USS and UAV-NF communicate with the peer end again. To be specific, according to the communication method provided in this embodiment of this application, the UAV-NF is allowed to detect whether the identity of the UTM/USS that sends an authentication and authorization revocation request is correct, that is, detect whether the UTM/USS is an authorized UTM/USS. This reduces the cases in which the authentication and authorization for the uncrewed aerial vehicle is unexpectedly revoked resulting from requests of an attacker, and improves system security.

Therefore, according to the communication method provided in this embodiment of this application, a UAV authentication revocation procedure is performed when it is determined that the TLS link has been established between the UAV-NF and the UTM/USS, and the integrity protection is enabled. Otherwise, the identity of the UTM/USS needs to be verified. This reduces the cases in which the authentication and authorization for the uncrewed aerial vehicle is unexpectedly revoked resulting from requests of an attacker.

According to a sixth aspect, a communication apparatus is provided. The apparatus includes: a transceiver module, configured to receive a first request message from a second network element, where the first request message is used to request to perform a first operation on a first terminal device; and a processing module, configured to determine, based on the first request message, whether the second network element is authorized to request to perform the first operation on the first terminal device.

The transceiver module may perform receiving and sending processing in the first aspect, and the processing module may perform processing other than the receiving and sending processing in the first aspect.

According to a seventh aspect, a communication apparatus is provided. The apparatus includes: a transceiver module, configured to send a first request message to a first network element, where the first request message is used to request to perform a first operation on a first terminal device, the first request message includes a first identifier and a second identifier, the first identifier is associated with the first terminal device, the second identifier is associated with a second network element, and the second identifier is used to determine whether the second network element is authorized to request to perform the first operation on the first terminal device.

The transceiver module may perform receiving and sending processing in the second aspect. The apparatus further includes a processing module, and the processing module may perform processing other than the receiving and sending in the second aspect.

According to an eighth aspect, a communication apparatus is provided. The apparatus includes a processor, configured to execute a computer program stored in a memory, so that the communication apparatus performs any one of the possible implementations of the first aspect and the second aspect.

According to a ninth aspect, a computer-readable storage medium is provided. The computer-readable storage medium stores a computer program, and when the computer program is run on a computer, the computer is enabled to perform any one of the possible implementations of the first aspect and the second aspect.

According to a tenth aspect, a chip system is provided. The chip system includes a processor, configured to invoke a computer program from a memory and run the computer program, so that a communication device in which the chip system is installed performs any one of the possible implementations of the first aspect and the second aspect.

BRIEF DESCRIPTION OF DRAWINGS

FIG. 11 is a schematic flowchart of a communication method according to still another embodiment of this application;

DESCRIPTION OF EMBODIMENTS

The following describes technical solutions of this application with reference to accompanying drawings.

The technical solutions provided in this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) system, a new radio (new radio, NR) system, or the like.

It should be understood that a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be a terminal or a network device, or a functional module that can invoke and execute a program and that is in UE or a network device.

For ease of understanding of embodiments of this application, an application scenario of embodiments of this application is first described in detail with reference to FIG. 1.

Figure 1:
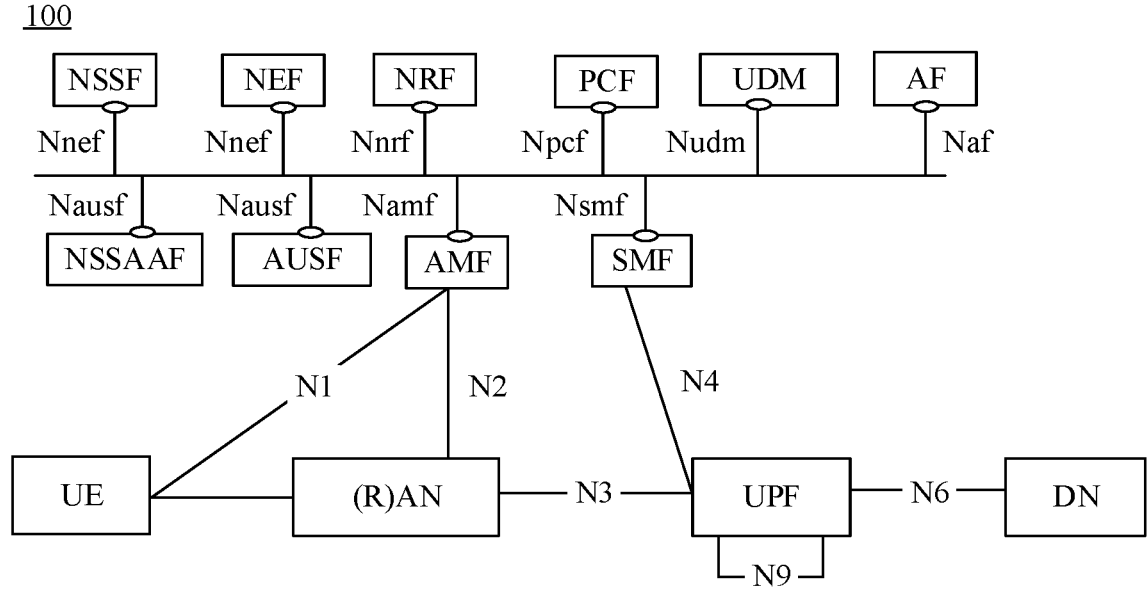
FIG. 1 is a schematic diagram of a network architecture applicable to a method according to an embodiment of this application.

FIG. 1 is a schematic diagram of a network architecture applicable to a method according to an embodiment of this application. The network architecture shown in FIG. 1 may include the following network elements.

1. User equipment (user equipment, UE): The UE may be referred to as a terminal device, a terminal, an access terminal, a subscriber unit, a subscriber station, a mobile station, a mobile console, a remote station, a remote terminal, a mobile device, a user terminal, a wireless communication device, a user agent, or a user apparatus. Alternatively, the UE may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal device in a 5G network, or a terminal device in a future evolved public land mobile network (public land mobile network, PLMN), or may be an end device, a logical entity, an intelligent device such as a mobile phone, a terminal device such as an intelligent terminal, a communication device such as a server, a gateway, a base station, or a controller, or an internet of things (internet of things) device such as a sensor, an electric meter, or a water meter. Alternatively, the UE may be a wired device, such as a computer or a notebook computer. This is not limited in embodiments of this application. The UE stores a long-term key and a related function. When performing bidirectional authentication with a core network element (such as an AMF or an AUSF), the UE verifies authenticity of a network by using the long-term key and the related function.

2. Access network (access network, AN): The AN is used to provide a network access function for authorized users in a specific area, and can use transmission tunnels with different quality based on user levels, service requirements, and the like. The access network may be an access network that uses different access technologies. Currently, there are two types of radio access technologies: a 3rd generation partnership project (3rd generation partnership project, 3GPP) access technology (for example, a radio access technology used in a 3G, 4G, or 5G system) and a non-3rd generation partnership project (non-3GPP) access technology. The 3GPP access technology is an access technology that complies with a 3GPP standard specification. An access network using the 3GPP access technology is referred to as a radio access network (radio access network, RAN). An access network device in a 5G system is referred to as a next generation node base station (next generation Node Base station, gNB). The non-3GPP access technology is an access technology that does not comply with the 3GPP standard specification, for example, an air interface technology represented by an access point (access point, AP) in Wi-Fi.

An access network that implements a network access function based on a wired communication technology may be referred to as a wired access network.

An access network that implements a network access function based on a wireless communication technology may be referred to as a radio access network (radio access network, RAN). The radio access network can manage radio resources, provide an access service for terminals, and further implement forwarding of control signals and user data between a terminal and a core network.

A radio access network may be, for example, a NodeB (NodeB), an evolved NodeB (evolved NodeB, eNB or eNodeB), a base station (gNB) in a 5G mobile communication system, a base station in a future mobile communication system, or an AP in a Wi-Fi system, or may be a radio controller in a cloud radio access network (cloud radio access network, CRAN) scenario. Alternatively, the access network device may be a relay station, an access point, a vehicle-mounted device, a wearable device, a network device in a future 5G network, a network device in a future evolved PLMN network, or the like. A specific technology and a specific device form used by the radio access network device are not limited in embodiments of this application.

3. Access and mobility management function (access and mobility management function, AMF) entity: The AMF entity is mainly used for mobility management, access management, and the like, and may be used to implement functions other than session management in functions of a mobility management entity (mobility management entity, MME), for example, lawful interception or access authorization (or authentication). In embodiments of this application, the AMF entity may be used to implement functions of an access and mobility management network element.

4. Session management function (session management function, SMF) entity. The SMF entity is mainly used for session management, UE internet protocol (internet protocol, IP) address allocation and management, termination selection of interfaces for management of user plane functions and policy control or charging functions, downlink data notification, and the like. In embodiments of this application, the SMF entity may be used to implement functions of a session management network element.

5. User plane function (user plane function, UPF) entity, namely, a data plane gateway: The UPF entity may be used for packet routing and forwarding, quality of service (quality of service, QoS) handling for user plane data, and the like. User data may be accessed to a data network (data network, DN) via this network element. In embodiments of this application, the UPF entity may be used to implement functions of the user plane gateway.

6. Data network (DN): The DN is a network that provides data transmission, for example, operator service networks, the Internet (Internet), third-party service networks, and the like.

7. Authentication server function (authentication server function, AUSF) entity: The AUSF entity is mainly used for user authentication and the like.

8. Network exposure function (network exposure function, NEF) entity: The NEF entity is used securely expose services, capabilities, and the like provided by 3GPP network functions.

9. Network repository function (network function (NF) repository function, NRF) entity: The NRF entity is used to store network function entities and description information of services provided by the network function entities, and support service discovery, network element entity discovery, and the like.

10. Policy control function (policy control function, PCF) entity: The PCF entity supports unified policy framework to govern network behavior, and provides policy rule information and the like to control plane function network elements (such as the AMF and SMF network elements).

11. Unified data management (unified data management, UDM) entity: The UDM entity is used for user identification handling, access authentication, registration, mobility management, and the like.

12. Application function (application function, AF) entity: The AF entity is used to perform application influence on traffic routing, access a network exposure function network element, or interact with a policy framework for policy control, and the like.

In the network architecture, an interface N1 is a reference point between a terminal and the AMF entity. An interface N2 is a reference point between the AN and the AMF entity, for transmission of non-access stratum (non-access stratum, NAS) message and the like. An interface N3 is a reference point between the (R)AN and the UPF entity, for transmission of user plane data and the like. An interface N4 is a reference point between the SMF entity and the UPF entity, for transmission of identification information of tunnels connected to the N3, data buffering indication information, downlink data notification messages, and the like. An interface N6 is a reference point between the UPF entity and the DN, for transmission of user plane data and the like.

Names of interfaces between the network elements in FIG. 1 are merely examples, and the interfaces may have other names during specific implementation. This is not specifically limited in this application. In addition, a name of a message (or signaling) transmitted between the foregoing network elements is merely an example, and does not constitute any limitation on a function of the message.

It should be understood that the foregoing network architecture applied to embodiments of this application is merely an example of a network architecture described from the perspective of a conventional point-to-point architecture and a service-based architecture. A network architecture applicable to embodiments of this application is not limited thereto. Any network architecture that can implement functions of the foregoing network elements is applicable to embodiments of this application.

It should be further understood that the AMF network element, the SMF network element, the UPF network element, the NSSF network element, the NEF network element, the AUSF network element, the NRF network element, the PCF network element, and the UDM network element shown in FIG. 1 may all be understood as network elements used to implement different functions in a core network, for example, may be combined into a network slice as required. These core network elements may be independent devices, or may be integrated into a same device to implement different functions. This is not limited in this application. A device that performs a function of the core network element may also be referred to as a core network device or a network device.

The foregoing names are merely used to distinguish between different functions, and do not mean that these network elements are independent physical devices. A specific form of the foregoing network elements is not limited in this application. For example, the network elements may be integrated into a same physical device, or may be different physical devices. In addition, the foregoing names are merely used to distinguish between different functions, and shall not constitute any limitation on this application. This application does not exclude a possibility of using another name in a 5G network and another future network. For example, in a 6G network, some or all of the foregoing network elements may use terms in 5G, or may use other names or the like. This is uniformly described herein, and details are not described below.

Figure 2:
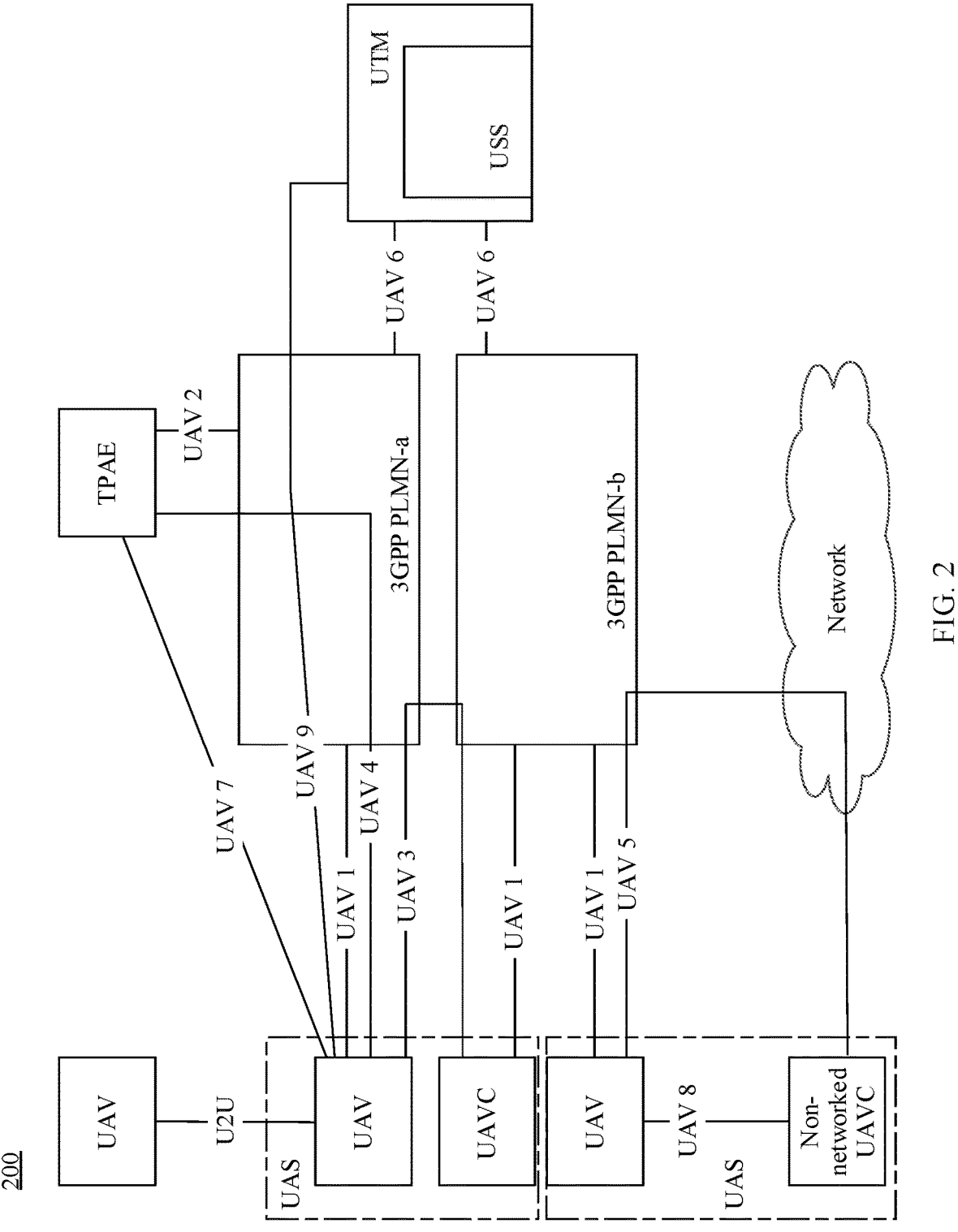
FIG. 2 is a schematic diagram of another network architecture applicable to a method according to an embodiment of this application.

FIG. 2 is a schematic diagram of another network architecture applicable to a method according to an embodiment of this application. The network architecture shown in FIG. 2 may include the following network elements.

1. Uncrewed aerial vehicle (uncrewed aerial vehicle, UAV): also referred to as unmanned aerial vehicle (unmanned aerial vehicle, UAV) or unmanned aircraft or air robot, is an unmanned plane that uses a radio remote control device and a self-provided program control apparatus, and can complete air flight tasks and various load tasks without any persons on board. The uncrewed aerial vehicle in embodiments of this application may be an uncrewed helicopter, a fixed-wing aircraft, a multi-rotor aircraft, an uncrewed airship, or an uncrewed parawing; or may include a space craft, for example, a stratospheric airship, a high-altitude balloon, or a solar uncrewed aerial vehicle; or may be an uncrewed aerial vehicle in various forms such as a four-axis vehicle, a six-axis vehicle, a single-axis vehicle, and a vector control vehicle. The uncrewed aerial vehicle in embodiments of this application may be used in fields such as military, industry, civil, agriculture, construction, video, and environmental protection, and special industries, such as military reconnaissance, patrol, aerial photography, environment monitoring, border monitoring, express delivery, and electric power inspection, confirmation of rights, flood control and drought relief, and post-disaster relief, in which the uncrewed aerial vehicle is used for operation. This is not limited in embodiments of this application.

It should be understood that a specific type of the uncrewed aerial vehicle is not limited in this specification. With development of intelligence, to be applied to different scenarios or to perform different aerial missions, names of devices having a function of the uncrewed aerial vehicle may be different. For ease of description, in all embodiments of this application, the foregoing apparatuses that can have the function of the uncrewed aerial vehicle are collectively referred to as the uncrewed aerial vehicle.

The uncrewed aerial vehicle may be equipped with a plurality of sensors or functional modules, such as a gyroscope (flight attitude sensing), an accelerometer, geomagnetic induction, a barometric pressure sensor (rough hover height control), an ultrasonic sensor (accurate hover height control or obstacle avoidance), an optical flow sensor (accurate hover horizontal position determining), a global positioning system (global positioning system, GPS) module (rough horizontal position positioning), a control circuit, and a compass, a normal flight attitude of the uncrewed aerial vehicle can be automatically maintained by collecting an angular rate, an attitude, a location, an acceleration, a height, an air velocity, and the like of the uncrewed aerial vehicle. It should be understood that names of the modules or the hardware configured for the uncrewed aerial vehicle are merely examples. During specific implementation, each functional module may have another name. This is not limited in embodiments of this application. The uncrewed aerial vehicle in embodiments of this application may further have more or fewer functional modules, or may implement more or fewer functions. This is not limited in embodiments of this application either.

2. Uncrewed aerial vehicle controller (uncrewed aerial vehicle controller, UAVC). The UAVC is configured to control an uncrewed aerial vehicle 202, for example, control flight states or flight actions of the uncrewed aerial vehicle. The uncrewed aerial vehicle controller may be a smartphone, a tablet, a laptop computer, a smartwatch, a smart remote control, a conventional remote control, a dedicated remote controller, or the like; may be an apparatus, for example, a wristband, a ring, a glove, an armband, or a watch, capable of controlling the uncrewed aerial vehicle using gestures; may be a head-mounted device, for example, a head cover, capable of mentally controlling the uncrewed aerial vehicle; or may be an apparatus, for example, a smart jacket or a jacket, capable of controlling the uncrewed aerial vehicle via users' body movement.

It should be understood that a specific type of the uncrewed aerial vehicle controller is not limited in this specification. With development of intelligence, names and forms of devices that have functions of the uncrewed aerial vehicle controller may be different. For ease of description, in all embodiments of this application, the foregoing apparatuses that can have the functions of the uncrewed aerial vehicle controller or can control the uncrewed aerial vehicle are collectively referred to as the uncrewed aerial vehicle controller.

The uncrewed aerial vehicle controller may control flight states of the uncrewed aerial vehicle. For example, the uncrewed aerial vehicle controller may control directions, ailerons, lifting and descending, tilting, speed, throttle, flaps, and the like of the uncrewed aerial vehicle, and may further control actions such as turning, climbing, pitchdown, rolling, hovering, taking off, and landing of the uncrewed aerial vehicle. This is not limited in embodiments of this application.

3. Uncrewed aerial system (uncrewed aerial system, UAS): The UAS is a general term for an uncrewed aerial vehicle and auxiliary communication stations and take-off (launch) recycling devices thereof, uncrewed aerial vehicle transportation, storage, detection devices, and the like. In this application, the UAS is composed of a UAV and a UAVC. For example, one uncrewed aerial vehicle controller may control one or more uncrewed aerial vehicles, one uncrewed aerial vehicle may also be controlled by one or more uncrewed aerial vehicle controllers, and a plurality of uncrewed aerial vehicle controllers may cooperatively control a plurality of uncrewed aerial vehicles. This is not limited in embodiments of this application.

4. Uncrewed aerial system service supplier (UAS service supplier, USS): The USS is an entity that supplies services to support the safe and efficient use of airspace by providing services to an operator or a pilot of an uncrewed aerial vehicle in meeting operational requirements of the uncrewed aerial vehicles. A USS can provide any subset of functionality to meet provider's business objectives. It should be noted that the name is merely used to indicate a function of the USS, and shall not constitute any limitation on this application. This application does not exclude a possibility of using another name in a subsequent standard.

5. Uncrewed aerial system traffic management (uncrewed aerial system traffic management, UTM): The UTM provides a set of functions and services for managing a range of autonomous vehicle operations (such as authenticating uncrewed aerial vehicles, authorizing uncrewed aerial vehicle services, managing uncrewed aerial vehicle policies, and controlling uncrewed aerial vehicle traffics in the airspace). It should be noted that the name is merely used to indicate a function of the UTM, and shall not constitute any limitation on this application. This application does not exclude a possibility of using another name in a subsequent standard.

In addition, an entity of the USS and an entity of the UTM may be one entity, and may be in an inclusion relationship, or may be in a parallel relationship. This is not limited in this application.

6. Third party authorized entity (third party authorized entity, TPAE): The TPAE can identify and/or trace a UAV and check for an invalid UAV within a range.

Figure 3:
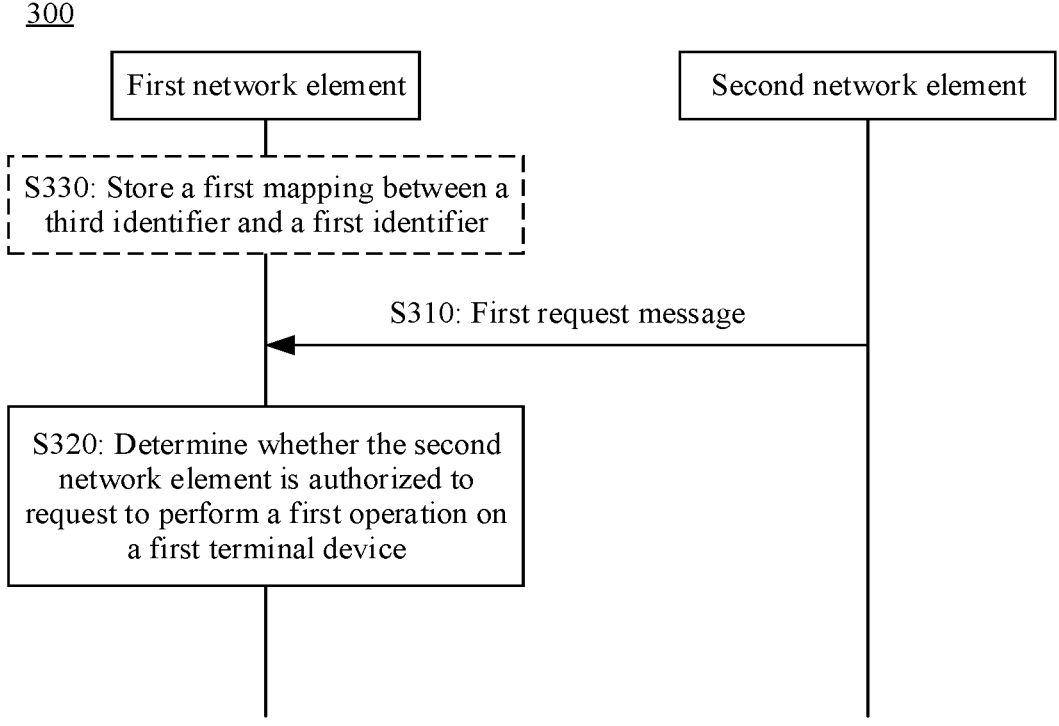
FIG. 3 is a schematic flowchart of a communication method according to an embodiment of this application.

In the architecture shown in FIG. 3, PLMN-a and PLMN-b belong to different operators, and identifiers UAV 1 to UAV 9 are connected to interfaces of network elements or other components in the foregoing architecture.

In addition to the network elements described above, this application further includes an uncrewed aerial vehicle network function (UAV network function, UAV-NF) and an uncrewed aerial vehicle flight enablement subsystem (UAV flight enablement subsystem, UFES). The UAV-NF or UFES provides an individual interface for the USS or UTM, executes a command delivered by the USS or UTM, and transmits information inside and outside the uncrewed aerial system. It should be noted that the name is merely used to indicate a function, and shall not constitute any limitation on this application. This application does not exclude a possibility of using another name in a subsequent standard. In addition, the UAV-NF or the UFES may be an existing network element or a new network element, or may be co-deployed with the NEF or a service capability exposure function (service capability exposure function, SCEF), or the NEF may undertake functions of the UAV-NF. In addition, an entity of the UAV-NF and an entity the UFES may be one entity, or may be in an inclusion relationship or in a parallel relationship. This is not limited in this application.

For ease of understanding, before embodiments of this application are described, some network elements or terms in this application are first briefly described.

Network slice-authentication and authorization function (network slice-specific authentication and authorization function, NSSAAF): The NSSAAF interacts with the AMF and an AAA-S (or AAA-P). The NSSAAF interacts with the AMF over a service-based interface. The NSSAAF interacts with the AAA-S or AAA-P over an AAA interface. Therefore, the NSSAAF is responsible for a data transformation function between service-based interface data and AAA protocol-based data.

Authentication, authorization, and accounting server (authentication, authorization, and accounting server, AAA-S). The AAA-S is used to manage users that can access a network server and services available for authorized users, how to charge users using network resources, and the like. The AAA-S may be located inside or outside a 3GPP network. That the AAA-S is located inside the 3GPP network may be understood that the AAA-S is an operator-deployed AAA-S. That the AAA-S is located outside the 3GPP network may be understood that the AAA-S server is a third-party (not an operator) deployed server.

Authentication, authorization, and accounting proxy (authentication, authorization, and accounting proxy, AAA-P): The AAA-P is mainly used for message exchange between the NSSAAF and the AAA-S outside the 3GPP network.

Uncrewed aerial vehicle network function (UAV network function, UAV-NF): The UAV-NF perform, using an existing network exposure service, UUAA, UAV pairing authentication and authorization, a related revocation procedure, UAV location reporting, and the like.

FIG. 3 is a schematic flowchart of a communication method 300 according to an embodiment of this application. As shown in FIG. 3, the method 300 includes the following steps.

S310: A second network element sends a first request message to a first network element, where the first request message is used to request to perform a first operation on a first terminal device.

In a specific example, in a network slice scenario, the second network element is, for example, an AAA-S; the first network element is, for example, an NSSAAF; the first terminal device is, for example, a user equipment UE; and the first operation is, for example, network slice-specific re-authentication. To be specific, the AAA-S sends the first request message to the NSSAAF, to request to perform network slice-specific re-authentication on the UE. The first operation includes the network slice-specific re-authentication or network slice-specific authentication revocation.

In another specific example, in an uncrewed aerial vehicle scenario, the second network element is, for example, a UTM; the first network element is, for example, a UAV-NF; the first terminal device is, for example, a UAV; and the first operation is, for example, uncrewed aerial vehicle authentication and authorization revocation. To be specific, the UTM sends the first request message to the UAV-NF, to request to perform an operation of revoking uncrewed aerial vehicle authentication and authorization on the UAV. The first operation includes authentication and authorization revocation or pairing authentication and authorization revocation.

It should be understood that, that the second network element requests, via the first request message, the first network element to perform the first operation on the first terminal device may be understood as that the second network element requests, via the first request message, to perform the first operation on all parameters that are related to a first request and that are used by the first terminal device, or the second network element requests, via the first request message, to perform the first operation on a parameter that is related to a first request and that is used by the first terminal device. For example, in a network slice scenario, a first control device is, for example, an AAA-S; a first communication apparatus is, for example, an NSSAAF; the first terminal device is, for example, a user equipment UE; a parameter corresponding to the UE is at least one piece of S-NSSAI; and the first operation is, for example, network slice-specific re-authentication. To be specific, the AAA-S sends the first request message to the NSSAAF, to request to perform network slice-specific re-authentication on network slices corresponding to all pieces of S-NSSAI of the UE, or the AAA-S sends the first request message to the NSSAAF, to request to perform network slice-specific re-authentication on a network slice corresponding to one piece of S-NSSAI of the UE.

Optionally, before S310, the first network element performs a second operation on the second network element, where the second operation is associated with the first operation. For example, in a network slice scenario, the second operation is network slice-specific authentication, and the first operation is network slice-specific re-authentication. For another example, in an uncrewed aerial vehicle scenario, the second operation is authentication and authorization, and the first operation is authentication and authorization revocation.

S320: The first network element determines whether the second network element is authorized to request to perform the first operation on the first terminal device.

It should be understood that the second network element that is authorized to request to perform the first operation on the first terminal device may be understood as a network element with a correct identity or a valid identity, or a network element whose identity information is associated with related service information, where the association means having a valid association. For example, an association relationship meeting a predefinition may be understood as a valid association relationship. Optionally, the first request message includes a first identifier and a second identifier, and the first identifier and the second identifier are used to verify whether the second network element is authorized to perform the first operation on the first terminal device. The first identifier is associated with the first terminal device, and the second identifier is associated with the second network element. It should be understood that the first identifier associated with the first terminal device may be an identifier for identifying an identity of the first terminal device. For example, in an uncrewed aerial vehicle scenario, the first identifier may be a 3GPP UAV ID of a UAV. Alternatively, the first identifier may be a service identifier of the first terminal device. For example, in a network slice scenario, the first identifier is single network slice selection assistance information S-NSSAI. The second identifier associated with the second network element may be identification information of the second network element, for example, address information or identity information of the second network element, or may be information associated with a service of the second network element. The information needs to be information hardly available for attackers.

In a specific example, in a network slice scenario, the second identifier may include at least one of the following information: an identity ID of the second network element, an internet protocol IP address of the second network element, and a fully qualified domain name FQDN of the second network element; and the first identifier includes single network slice selection assistance information S-NSSAI.

In another specific example, in an uncrewed aerial vehicle scenario, the second identifier may include an identity ID of the second network element and/or a civil aviation authority level uncrewed aerial vehicle identifier of the first terminal device; and the first identifier includes an identity ID of the first terminal device. Optionally, in S330, the first network element stores a mapping between a third identifier and the first identifier, where the third identifier is associated with a third network element.

It should be understood that the mapping may indicate an authorization relationship, and the mapping indicates that the network element corresponding to the third identifier is authorized to perform the first operation on the first terminal device.

It should be understood that an attribute of the third identifier is the same as that of the second identifier, that is, the third identifier and the second identifier are identifiers of a same type. For example, if both the third identifier and the second identifier are IP addresses, the third identifier is an IP address of the third network element, and the second identifier is the IP address of the second network element. There is a mapping between the third identifier and the first identifier, that is, the third network element is associated with the first identifier, indicating that the third network element is authorized to perform the first operation on the first terminal device.

That a network element that has a mapping with a terminal device is authorized to request to perform the first operation on the terminal device may be understood as that the two identifiers respectively identify a terminal device and a network element in a case that there is a mapping between two identifiers, indicating that the network element is authorized to request to perform the first operation on the terminal device. Identifying a terminal device may be understood as that the identifier is an identifier of the terminal device, or an identifier of one or more parameters corresponding to the terminal device. For example, in a slice scenario, an identifier of a terminal device is S-NSSAI, and an identifier of a network element is an IP address, an FQDN, or the like. For another example, in an uncrewed aerial vehicle scenario, an identifier of a terminal device is a 3GPP UAV ID, and an identifier of a network element is a UTM/USS ID, or a CAA-level UAV ID, or the like.

It should be understood that the second network element may be the same as or different from the third network element. For example, when the second network element is an attacker, the second network element is not a control device associated with the first identifier.

It should be understood that the first network element may be preconfigured with mappings between a plurality of identifiers associated with a plurality of control devices and a plurality of identifiers associated with a plurality of terminal devices in a system, or may locally store mappings between a plurality of identifiers associated with a plurality of control devices and a plurality of identifiers associated with a plurality of terminal devices after determining the mapping based on another related identifier in a system.

For example, after receiving the first request message, the first network element determines, based on the first identifier, the second identifier, and the mapping, whether the second network element is authorized to perform the first operation on the first terminal device.

For example, the first network element locally stores the mapping between the third identifier and the first identifier. After receiving the first request message and obtaining the first identifier from the first request message, the first network element determines the third identifier based on the first identifier and the mapping. When the second identifier matches the third identifier, the first network element determines that the second network element is authorized to request to perform the first operation on the first terminal device; or when the second identifier does not match the third identifier, the first network element determines that the second network element is not authorized to perform the first operation on the first terminal device.

It should be noted that, that the second identifier matches the third identifier indicates that the second identifier is the same as the third identifier, or an identifier that is the same as the second identifier may be based on the third identifier, or an identifier that is the same as the second identifier may be based on the third identifier. For example, the second identifier is an IP address #1 of the second network element, and the third identifier is an IP address #2 of the third network element. When the IP address #1 is the same as the IP address #2, it indicates that the second identifier matches the third identifier; or when the IP address #1 is not the same as the IP address #2, it indicates that the second identifier does not match the third identifier. For another example, the second identifier is an IP address #1 of the second network element, the third identifier is an FQDN of the third network element, and the first network element determines an IP address #2 of the third network element based on the FQDN. When the IP address #1 is the same as the IP address #2, it indicates that the second identifier matches the third identifier; or when the IP address #1 is not the same as the IP address #2, it indicates that the second identifier does not match the third identifier. For another example, the second identifier is an IP address #1 of the second network element, and the third identifier is an FQDN of the third network element, and the first network element determines an FQDN #2 of the third network element based on the IP address #1. When the FQDN #1 is the same as the FQDN #2, it indicates that the second identifier matches the third identifier; or when the FQDN #1 is not the same as the FQDN #2, it indicates that the second identifier does not match the third identifier.

When the first network element determines that the second network element is authorized to request to perform the first operation on the first terminal device, the first network element performs a procedure of the first operation on the first terminal device based on the first request message. When the first network element determines that the second network element is not authorized to request to perform the first operation on the first terminal device, the first network element terminates a procedure of the first operation. Specifically, for example, the first network element ignores or discards the first request message, or the first network element sends a response message to the second network element, where the response message is used to reject the first request message.

Optionally, the first network element establishes a security link to the second network element.

The establishing a security link may include: during network establishment, establishing the security link to the second control device by the first communication apparatus based on a device pre-configuration or manual triggering, establishing the security link when the first communication apparatus and the second control device communicate with a peer end for the first time, or establishing the security link when the first network element and the second network element communicate with the peer end again. The difference lies in that the establishing of the security link to the second network element by the first network element for the first time is a link establishment procedure initiated by the first network element. For example, in an NSSAA procedure, the first network element initiates a procedure of establishing the security link to the second network element. However, a process of establishing the security link again may be initiated by the second network element. For example, in a network slice-specific re-authentication procedure, the second network element initiates a procedure of establishing the security link to the first network element.

For example, the first network element obtains security certificate information of the second network element, and establishes an internet protocol security IPsec tunnel with the second network element based on the security certificate information.

The first network element stores a fourth identifier during establishment of the security link or after establishment of the security link, where the fourth identifier is associated with the second network element and the security link.

It should be understood that the fourth identifier is associated with the second network element and the security link. Therefore, it may be considered that the fourth identifier is a real and unfalsified identifier associated with the second network element.

The first network element receives the first request message from the second network element through the security link, and obtains the second identifier from the first request message. When the first network element determines that the second identifier is the same as the fourth identifier, the first network element continues to perform the procedure in S320. When the first network element determines that the second identifier is different from the fourth identifier, the first network element terminates the procedure. For example, the first network element ignores or discards the first request message, or the first network element sends a rejection message to the second network element.

The first network element receives the first request message from the second network element through the security link, and obtains the first identifier from the first request message.

When the first network element determines that the third identifier associated with the first identifier or a mapping corresponding to the third identifier is the same as the fourth identifier, the first network element continues to perform the procedure in S320. When the first network element determines that the third identifier is different from the fourth identifier, the first network element terminates the procedure. For example, the first network element ignores or discards the first request message, or the first network element sends a response message to the second network element, where the response message is used to reject the first request message.

Therefore, according to the communication method in this embodiment of this application, whether a network element that sends a request message is authorized to request is verified, to determine whether the network element is a malicious attacker. This reduces impact on a system service resulting from requests of an attacker and improves system security.

After a network device completes slice-specific authentication on a terminal device, the AAA-S may initiate a re-authentication procedure or an authentication revocation procedure for some reasons. However, when an AAA-S is a malicious attacker, or a third-party network in which the AAA-S is located is compromised, the attacker may maliciously forge S-NSSAI and a GPSI, and initiate an authentication revocation or re-authentication operation to an AMF. For example, the attacker randomly generates a piece of S-NSSAI based on a GPSI corresponding to the S-NSSAI stored in the network. If randomly generated S-NSSAI and GPSI can be used in pairs, a network slice that is used by a terminal device corresponding to the randomly generated S-NSSAI is either re-authenticated repeatedly or revoked unexpectedly. Consequently, user experience of the terminal device is reduced, or a network slice cannot be used anymore. Therefore, how to identify whether an AAA-S is a malicious attacker is an urgent problem to be resolved currently.

Figure 4:
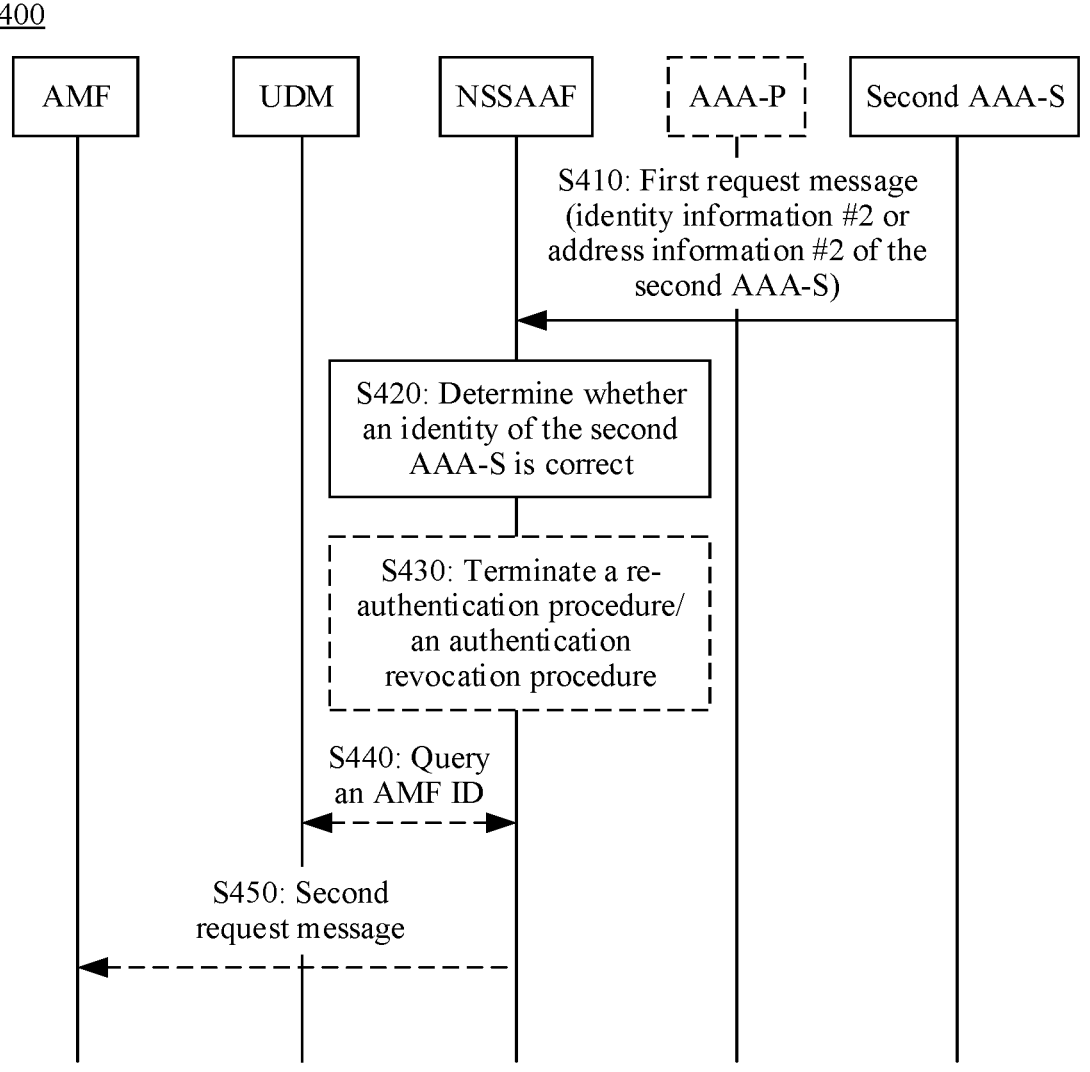
FIG. 4 is a schematic flowchart of a communication method according to another embodiment of this application.

FIG. 4 is a schematic flowchart of a communication method 400 in a network slice scenario according to an embodiment of this application.

It should be understood that before the method 400, a network side completes a slice-specific authentication procedure.

For example, an AMF initiates a slice-specific authentication (network slice-specific authentication and authorization, NSSAA) procedure. For example, the AMF initiates an NSSAA procedure based on a change of subscription data or triggering of a first AAA-S.

After obtaining single network slice selection assistance information (single network slice selection assistance information, S-NSSAI) from a terminal device, the AMF sends an authentication request message to an NSSAAF. The authentication request message includes an extensible authentication protocol identifier (extensible authentication protocol identity document, EAP ID), a generic public subscription identity (generic public subscription identifier, GPSI), and the S-NSSAI.

It should be noted that if there are a plurality of GPSIs in the subscription data of the terminal device, the AMF randomly selects one GPSI from the plurality of GPSIs, and then sends the selected GPSI, the EAP ID, and the S-NSSAI to the NSSAAF via the authentication request message.

The NSSAAF determines the first AAA-S based on an association relationship (local configuration of AAA-S address per S-NSSAI) between an address of the locally deployed first AAA-S and the S-NSSAI, and sends the authentication request message to the first AAA-S via an AAA protocol. It should be noted that, if the first AAA-S is outside a 3GPP network, the NSSAAF needs to communicate with the first AAA-S via an AAA-P. In other words, the NSSAAF first sends the authentication request message to the AAA-P, and then the AAA-P sends the message to the AAA-P. Similarly, if the first AAA-S outside the 3GPP network needs to send a message to the NSSAAF, the message also needs to be forwarded via the AAA-P. For brevity, a similar procedure in a subsequent solution is not described in detail in this application.

The network side completes the slice-specific authentication procedure based on the foregoing information.

It should be noted that the NSSAAF is locally preconfigured with an association relationship between address information #1 of the first AAA-S and the S-NSSAI, and the address information #1 may be understood as information that can be used to find the AAA-S. For example, if address information of the first AAA-S is an IP address of the first AAA-S, the NSSAAF may directly send a message to the first AAA-S. For example, the address information of the first AAA-S may be, for example, a fully qualified domain name (fully qualified domain name, FQDN). The FQDN is an index, and the index may indicate, for example, "an AAA-S of a first network". Therefore, the NSSAAF may obtain the IP address of the first AAA-S based on the FQDN, and may further send the message to the first AAA-S. For example, the address information of the first AAA-S is a data network name (data network name, DN) of an application in which the first AAA-S is located, for example, "Google" or "Baidu". The NSSAAF may obtain, from a domain name server (domain name server, DNS) based on the data network name, the IP address of the first AAA-S or an IP address of a gateway on the network side where the first AAA-S is located, to find the first AAA-S.

Identity information #1 of the first AAA-S uniquely identifies the first AAA-S. For example, the identity information #1 of the first AAA-S is an internet protocol (internet protocol, IP) address of the AAA-S, a globally unique identity (identity document, ID) of the first AAA-S, or identity information carried in a certificate.

In conclusion, the address information #1 of the first AAA-S may be the same as or different from the identity information #1 of the first AAA-S. It may be understood that, if the address information #1 of the first AAA-S may be the same as the identity information #1 of the first AAA-S, the address information #1 of the first AAA-S may directly reflect an identity of the first AAA-S. If the address information of the first AAA-S may be different from identity information of the first AAA-S, the address information #1 of the first AAA-S cannot directly reflect an identity of the first AAA-S. In this case, the identity information #1 of the first AAA-S may be obtained based on the address information #1 of the first AAA-S.

When the address information #1 of the first AAA-S cannot directly reflect the identity of the first AAA-S, the NSSAAF may determine the identity information #1 of the first AAA-S based on the address information #1 of the first AAA-S, and optionally store an association relationship between the identity information #1 of the first AAA-S and S-NSSAI. For example, when the address information of the first AAA-S is an FQDN, the FQDN is not the identity information (for example, the IP address) of the first AAA-S. The NSSAAF may determine the identity information #1 of the first AAA-S based on the FQDN, and optionally store an association relationship between the identity information #1 of the first AAA-S and S-NSSAI.

Optionally, the NSSAAF obtains timestamp information. A timestamp is bound to the identity information #1 of the first AAA-S, and indicates valid time of the identity information of the first AAA-S. For example, the identity information #1 of the first AAA-S is the IP address of the first AAA-S, and the IP address is updated after the validity time expires. In this case, the NSSAAF may determine the valid time of the IP address based on the timestamp information. After the valid time expires, the NSSAAF deletes the identity information #1 of the first AAA-S.

As shown in FIG. 4, the method 400 includes the following steps.

S410: A second AAA-S sends a first request message, where the first request message is used to request to perform network slice-specific re-authentication or network slice-specific authentication revocation on the terminal device (not shown in the figure), and the first request message includes the GPSI of the terminal device and the S-NSSAI. Optionally, the first request message further includes identity information #2 of the second AAA-S or address information #2 of the second AAA-S. Correspondingly, the NSSAAF receives the first request message from the second AAA-S.

It should be noted that the second AAA-S may be the same as or different from the first AAA-S in the slice-specific authentication procedure. For example, the second AAA-S is a malicious attacker, and in this case, the second AAA-S and the first AAA-S are not the same.

S420: The NSSAAF determines whether an identity of the second AAA-S is correct. It may be understood that the NSSAAF determines whether there is an association relationship between the second AAA-S and the S-NSSAI. If there is the association relationship, the second AAA-S may legally initiate a slice-specific authentication procedure related to the S-NSSAI. If there is no association relationship, the AAA-S is not an actual controller of the S-NSSAI. In other words, the second AAA-S may be considered as a malicious AAA-S controlled by an attacker.

For example, the NSSAAF obtains, based on the first request message, information for identifying the identity of the AAA-S, for example, the identity information #2 of the AAA-S or the address information #2 of the AAA-S, and then verifies whether an association relationship between identity information for identifying the AAA-S and the S-NSSAI is correct. If the identity of the AAA-S is correct, it indicates that the AAA-S is authorized to request to perform the network slice-specific re-authentication or network slice-specific authentication revocation on the NSSAI.

In an example, the NSSAAF is preconfigured with the association relationship between the address information #1 of the first AAA-S and the S-NSSAI. The first request message sent by the AAA-S in S410 carries the GPSI, the S-NSSAI, and the address information #2 of the second AAA-S. It should be noted that the address information #1 is address information stored in preconfigured information of the NSSAAF, and therefore, it may be considered that the address information #1 is real address information of the AAA-S. The address information #2 is address information of the second AAA-S that requests re-authentication or authentication revocation, and the second AAA-S may be masqueraded by an attacker. The NSSAAF receives the first request message, obtains the address information #2 from the first request message, obtains the address information #1 associated with the S-NSSAI from a local storage based on the S-NSSAI carried in the first request message, and compares the address information #1 with the address information #2. If the address information #2 is the same as the address information #1, the NSSAAF determines that the identity of the second AAA-S is correct, that is, the second AAA-S can be associated with the S-NSSAI. If the address information #2 is not the same as the address information #1, the NSSAAF determines that the identity of the second AAA-S is incorrect, that is, the second AAA-S cannot be associated with the S-NSSAI. It should be noted that, it should be assumed herein that the attacker can control the second AAA-S, but cannot control the address information #2 of the second AAA-S. Therefore, it may be considered that the address information #2 is the real address information of the second AAA-S that requests re-authentication or authentication revocation.

In another example, in the slice-specific authentication procedure or after the slice-specific authentication procedure succeeds, the NSSAAF determines the identity information #1 of the first AAA-S based on the locally preconfigured address information #1 of the first AAA-S.

For example, the NSSAAF obtains the identity information #1 based on the address information #1 of the first AAA-S. Specifically, for example, the NSSAAF requests the identity information #1 of the first AAA-S from a network management system or the DNS server based on the address information #1 of the first AAA-S. After obtaining the identity information #1, the NSSAAF stores the association relationship between the identity information #1 of the first AAA-S and the S-NSSAI. The first request message sent by the second AAA-S in S410 carries the GPSI, the S-NSSAI, and the address information #2 of the second AAA-S. The NSSAAF receives the first request message, and obtains the address information #2 from the first request message. Then, the NSSAAF determines, based on the address information #2, the identity information #2 corresponding to the address information #2, and the identity information #2 is identity information of the second AAA-S that sends the first request message. The NSSAAF obtains the identity information #1 associated with the S-NSSAI based on the S-NSSAI in the first request message, and compares the identity information #1 with the identity information #2. If the identity information #1 is the same as the identity information #2, the NSSAAF determines that the identity of the second AAA-S is correct, that is, the second AAA-S can be associated with the S-NSSAI. If the identity information #1 is not the same as the identity information #2, the NSSAAF determines that the identity of the second AAA-S is incorrect, that is, the second AAA-S cannot be associated with the S-NSSAI. The method in this embodiment is applicable to a method in which the address information #1 stored in the NSSAAF is different from the address information #2 stored in the AAA-S, but the two pieces of address information can be used to obtain the same identity information. For example, the address information #1 stored in the NSSAAF is stored in a form of an FQDN, and the address information #2 sent by the second AAA-S is sent in a form of a DN. However, a same IP address may be obtained based on both the FQDN and the DN.

In still another example, the NSSAAF is preconfigured with the association relationship between the address information #1 of the first AAA-S and the S-NSSAI. The first request message sent by the second AAA-S in S410 carries the GPSI, the S-NSSAI, and the identity information #2 of the second AAA-S. The NSSAAF receives the first request message and obtains the identity information #2. The NSSAAF obtains the address information #1 corresponding to the S-NSSAI from a local storage based on the S-NSSAI in the first request message, and obtains the identity information #1 corresponding to the address information #1 based on the address information #1. The NSSAAF compares the identity information #1 with the identity information #2. If the identity information #1 is the same as the identity information #2, the NSSAAF determines that the identity of the second AAA-S is correct, that is, the second AAA-S can be associated with the S-NSSAI. If the identity information #1 is not the same as the identity information #2, the NSSAAF determines that the identity of the second AAA-S is incorrect, that is, the second AAA-S cannot be associated with the S-NSSAI.

In yet another example, in the slice-specific authentication procedure or after the slice-specific authentication procedure succeeds, the NSSAAF determines the identity information #1 of the first AAA-S based on the locally preconfigured address information #1 of the first AAA-S, and stores the association relationship between the identity information #1 of the first AAA-S and the S-NSSAI after the slice-specific authentication procedure succeeds. The first request message sent by the second AAA-S in S410 carries the GPSI, the S-NSSAI, and the identity information #2 of the AAA-S. The NSSAAF receives the first request message and obtains the identity information #2. The NSSAAF obtains the identity information #1 corresponding to the S-NSSAI from a local storage based on the S-NSSAI in the first request message. The NSSAAF compares the identity information #1 with the identity information #2. If the identity information #1 is the same as the identity information #2, the NSSAAF determines that the identity of the second AAA-S is correct, that is, the second AAA-S can be associated with the S-NSSAI. If the identity information #1 is not the same as the identity information #2, the NSSAAF determines that the identity of the second AAA-S is incorrect, that is, the second AAA-S cannot be associated with the S-NSSAI.

In still yet another example, the first request message sent by the second AAA-S in S410 carries the GPSI and the S-NSSAI. After receiving the first request message, the NSSAAF determines the address information #2 or the identity information #2 of the second AAA-S based on the first request message. For example, the NSSAAF obtains a source IP address in the first request message, and determines the source IP address as the identity information #2. The NSSAAF receives the first request message, and obtains the address information #1 corresponding to the S-NSSAI from a local storage based on the S-NSSAI in the first request message. The NSSAAF compares the address information #1 with the address information #2, or the NSSAAF obtains the identity information #1 based on the address information #1, and compares the identity information #1 with the identity information #2. If the address information #1 is the same as the address information #2, or the identity information #1 is the same as the identity information #2, the NSSAAF determines that the identity of the second AAA-S is correct, that is, the second AAA-S can be associated with the S-NSSAI. If the address information #1 is not the same as the address information #2, or the identity information #1 is not the same as the identity information #2, the NSSAAF determines that the identity of the second AAA-S is incorrect, that is, the second AAA-S cannot be associated with the S-NSSAI.

Optionally, in S430, if the NSSAAF determines that the identity of the second AAA-S is incorrect, the NSSAAF terminates a re-authentication procedure/an authentication revocation procedure. Optionally, further, the NSSAAF initiates an alarm, and records the alarm in a log. For example, when the NSSAAF determines that the identity of the second AAA-S is incorrect, the NSSAAF directly discards the first request message. For another example, when the NSSAAF determines that the identity of the second AAA-S is incorrect, the NSSAAF sends a first response message to the second AAA-S. The first response message includes a GPSI and S-NSSAI, and indicates a re-authentication failure/an authentication revocation failure.

If the NSSAAF determines that the identity of the second AAA-S is correct, the NSSAAF continues to perform a re-authentication procedure or an authentication revocation procedure. For example, the NSSAAF requests to query an AMF ID from the UDM in S440, determines, based on the AMF ID, an AMF corresponding to the terminal device, and sends a second request message to the AMF. The second request message is used to request re-authentication/authentication revocation. The AMF performs re-authentication/authentication revocation based on the first request message.

Therefore, according to the communication method provided in this embodiment of this application, the first request message sent by the AAA-S to the NSSAAF carries address information and/or identity information of the AAA-S, and the address information and/or the identity information of the AAA-S is verified to determine whether an identity of the AAA-S is correct. This reduces repeated re-authentication or authentication revocation between the terminal device and a network slice resulting from requests of an attacker.

Figure 5:
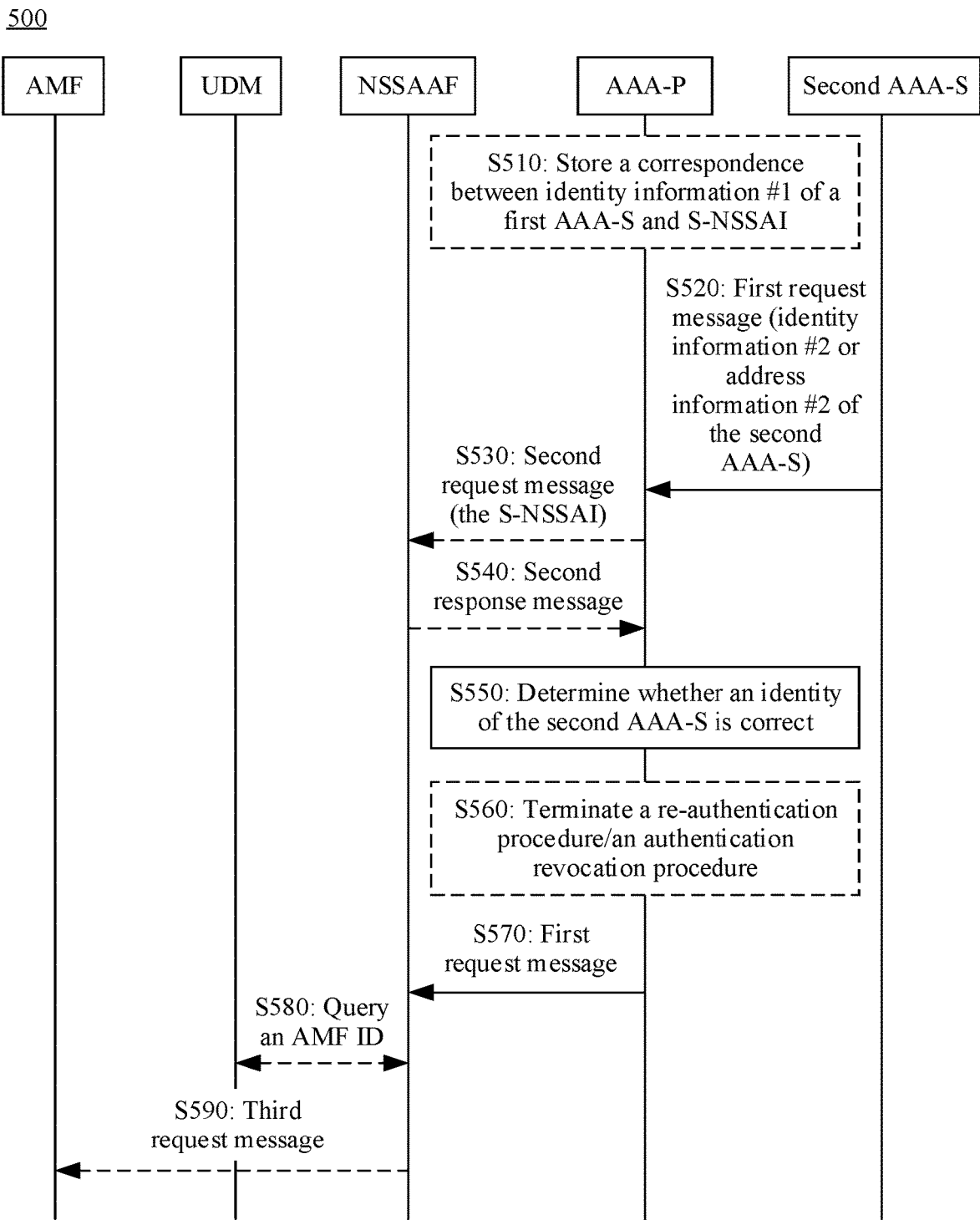
FIG. 5 is a schematic flowchart of a communication method according to still another embodiment of this application.

FIG. 5 is a schematic flowchart of a communication method 500 in a network slice scenario according to an embodiment of this application. In the method 500, an AAA-S is outside a 3GPP network. In this case, the AAA-S communicates with an NSSAAF via an AAA-P.

It should be understood that, before the method 500, a network side completes a slice-specific authentication procedure with a first AAA-S. The procedure is similar to the slice-specific authentication procedure before the method 400. For brevity, details are not described again.

As shown in FIG. 5, the method 500 includes the following steps.

Optionally, in S510, the AAA-P stores a mapping between identity information #1 of the first AAA-S and S-NSSAI.

For example, in the slice-specific authentication procedure or after the slice-specific authentication procedure, the AAA-P stores the mapping between the identity information #1 of the first AAA-S and the S-NSSAI. The identity information #1 may be, for example, a first AAA-S ID or a first AAA-S IP.

S520: A second AAA-S sends a first request message, where the first request message is used to request to perform network slice-specific re-authentication or network slice-specific authentication revocation on a terminal device, and the request message includes a GPSI of the terminal device and the S-NSSAI. Optionally, the first request message further includes identity information #2 of the second AAA-S or address information #2 of the second AAA-S. Correspondingly, the AAA-P receives the first request message from the second AAA-S.

It should be understood that when the AAA-P does not perform S510, that is, the AAA-P does not store the mapping between the identity information #1 of the first AAA-S and the S-NSSAI before S520, optionally, in S530, the AAA-P sends a second request message to the NSSAAF, where the second request message includes the S-NSSAI, and is used to request to obtain address information #1 or the identity information #1 of the first AAA-S.

S540: The NSSAAF sends a second response message to the AAA-P.

For example, the NSSAAF receives the second request message sent by the AAA-P, and obtains the S-NSSAI carried in the second request message. The NSSAAF determines, based on the S-NSSAI, the identity information #1 or the address information #1 corresponding to the S-NSSAI. Then, the NSSAAF sends the second response message to the AAA-P, where the second response message includes the identity information #1 or the address information #1, and the identity information #1 and the address information #1 are associated with the S-NSSAI.

In an example, the first request message sent by the second AAA-S in S520 includes the GPSI, the S-NSSAI, and the address information #2. After receiving the first request message, the AAA-P sends the second request message to the NSSAAF, where the second request message includes the S-NSSAI. The NSSAAF determines, in a local storage based on the S-NSSAI, the address information #1 associated with the S-NSSAI. Then, the NSSAAF sends the second response message to the AAA-P, where the second response message includes the address information #1, and the address information #1 is associated with the S-NSSAI.

In another example, the first request message sent by the second AAA-S in S520 includes the GPSI, the S-NSSAI, and the identity information #2. After receiving the first request message, the AAA-P sends the second request message to the NSSAAF, where the second request message includes the S-NSSAI. The NSSAAF determines, based on the S-NSSAI, the identity information #1 associated with the S-NSSAI. Then, the NSSAAF sends the second response message to the AAA-P, where the second response message includes the identity information #1, and the identity information #1 is associated with the S-NSSAI. It should be noted that the NSSAAF may locally store the mapping between the S-NSSAI and the identity information #1 of the first AAA-S in the slice-specific authentication procedure or after the slice-specific authentication procedure is completed, or may first determine the address information #1 of the first AAA-S based on the S-NSSAI after receiving the second request message, and then determine the identity information #1 based on the address information #1. This is not limited in this application.

S550: The AAA-P determines whether an identity of the second AAA-S is correct.

It should be understood that S560 in the method 500 is similar to S420 in the method 400. For brevity, details are not described again in this application.

Optionally, in S560, if the AAA-P determines that the identity of the second AAA-S is incorrect, the AAA-P terminates a re-authentication procedure/an authentication revocation procedure.

It should be understood that S560 in the method 500 is similar to S430 in the method 400. For brevity, details are not described again in this application.

If the AAA-P determines that the identity of the second AAA-S is correct, the AAA-P continues to perform a re-authentication procedure or an authentication revocation procedure. For example, in S570, the AAA-P forwards the first request message to the NSSAAF, where the first request message is used to request re-authentication or request authentication revocation, and the request message includes the GPSI of the terminal device and the S-NSSAI.

It should be understood that S580 and S590 in the method 500 are similar to S440 and S450 in the method 400. For brevity, details are not described again in this application.

Therefore, according to the communication method provided in this embodiment of this application, the first request message sent by the AAA-S to the AAA-P carries address information and/or identity information of the AAA-S, and the address information and/or the identity information of the AAA-S is verified to determine whether an identity of the AAA-S is correct. This reduces repeated re-authentication or authentication revocation between the terminal device and a network slice resulting from requests of an attacker.

Some attackers may further forge real address information or identity information of the AAA-S. For example, in the method 400 and the method 500, the address information #2 forged by the attacker is associated with the GPSI and the S-NSSAI, and the address information #2 is the same as the address information #1. Alternatively, the identity information #2 forged by the attacker is associated with the GPSI and the S-NSSAI, and the identity information #2 is the same as the address information #1. In this case, the NSSAAF or the AAA-P may consider that an identity of the attacker is correct. Therefore, how to prevent the attacker from bypassing detection by forging the address information or identity information of the AAA-S is a technical problem that needs to be resolved.

Figure 6:
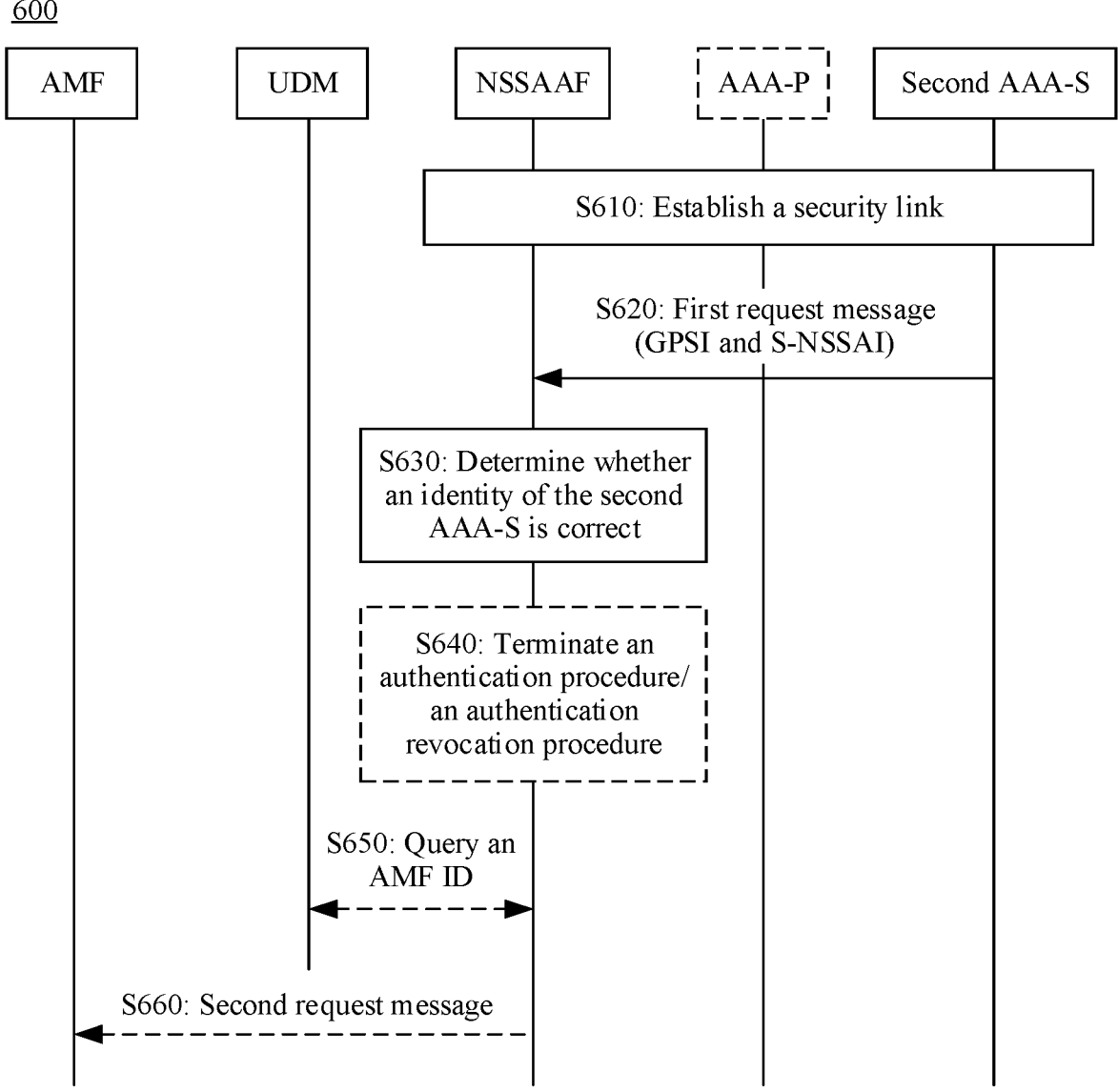
FIG. 6 is a schematic flowchart of a communication method according to still another embodiment of this application.

FIG. 6 is a schematic flowchart of a communication method 600 in a network slice scenario according to an embodiment of this application.

It should be understood that, before the method 600, a network side completes a slice-specific authentication procedure with a first AAA-S. The procedure is similar to the slice-specific authentication procedure before the method 400. For brevity, details are not described again.

As shown in FIG. 6, the method 600 includes the following steps.

S610: Establish a security link between an NSSAAF and a second AAA-S.

In an example, the NSSAAF obtains a security certificate of the second AAA-S, where the security certificate carries identity information #2 of the second AAA-S. The NSSAAF establishes an internet protocol security (internet protocol security, IPsec) tunnel with the second AAA-S based on the security certificate of the second AAA-S, where authentication is performed on the IPsec tunnel by using the security certificate.

In another example, an application layer link such as a transport layer security (transport layer security, TLS) protocol/datagram transport layer security (datagram transport layer security, DTLS) protocol is established between the NSSAAF and the second AAA-S.

A manner of establishing the security link is not limited in this application.

In addition, it should be noted that the establishing a security link may include: during network establishment, establishing the security link between the NSSAAF and the second AAA-S based on a device pre-configuration or manual triggering, establishing the security link when the NSSAAF and the second AAA-S communicate with a peer end for the first time, or establishing the security link when the first network element and the second network element communicate with the peer end again. The difference lies in that the establishing of the security link to the second network element by the first network element for the first time is a link establishment procedure initiated by the first network element. For example, in an NSSAA procedure, the first network element initiates a procedure of establishing the security link to the second network element. However, a process of establishing the security link again may be initiated by the second network element. For example, in a network slice-specific re-authentication procedure, the second network element initiates a procedure of establishing the security link to the first network element.

In addition, it should be noted that, after establishment of the security link between the NSSAAF and the second AAA-S is completed, integrity protection may be performed on a message transmitted between the NSSAAF and the second AAA-S, that is, data transmission is performed between the NSSAAF and the AAA-S by using a negotiated key, which can effectively prevent an attacker from masquerading an identity. A security certificate of an AAA-S cannot be forged or falsified. Therefore, identity information carried in the security certificate cannot be forged or falsified either. In other words, the identity information #2 carried in the security certificate of the second AAA-S is real identity information of the second AAA-S.

Optionally, the NSSAAF obtains the identity information #2 of the second AAA-S and identification information of the security link during establishment of the security link to the second AAA-S, and stores an association relationship between an identifier of the security link and the identity information #2 after successfully establishing the security link to the second AAA-S. After receiving, through the security link, a first request message sent by the second AAA-S, the NSSAAF obtains S-NSSAI in the first request message. The NSSAAF further obtains the identity information #2 based on the identifier of the security link. The NSSAAF determines identity information #1 based on the S-NSSAI. A specific manner is similar to the method 400 to the method 600. Details are not described again. The NSSAAF compares the identity information #1 with the identity information #2. If the identity information #1 is the same as the identity information #2, the NSSAAF determines that an identity of the second AAA-S is correct. If the identity information #1 is not the same as the identity information #2, the NSSAAF determines that an identity of the second AAA-S is incorrect.

S620: The second AAA-S sends the first request message to the NSSAAF, where the first request message is used to request to perform network slice-specific re-authentication or network slice-specific authentication revocation on a terminal device (not shown in the figure), and the first request message includes a GPSI and the S-NSSAI.

S630: The NSSAAF determines whether the identity of the second AAA-S is correct.

In an example, the NSSAAF obtains the security certificate of the second AAA-S, and obtains the identity information #2 of the second AAA-S from the security certificate in S610. The NSSAAF receives the first request message, and obtains the S-NSSAI from the first request message. The NSSAAF determines, from local preconfigured information based on the S-NSSAI, address information #1 of a first AAA-S associated with the S-NSSAI, and determines identity information #1 of the AAA-S based on the address information #1. The NSSAAF compares the address information #1 with the address information #2. If the address information #2 is the same as the address information #1, the NSSAAF determines that the identity of the second AAA-S is correct. If the address information #2 is not the same as the address information #1, the NSSAAF determines that the identity of the second AAA-S is incorrect.

In another example, the method for verifying the identity of the second AAA-S in the method 400 is used to determine whether the identity of the second AAA-S is correct. For example, the first request message in S620 further carries address information #2 of the second AAA-S. The NSSAAF determines, based on the S-NSSAI in the first request message, address information #1 of the first AAA-S associated with the S-NSSAI, and then compares the address information #1 with the address information #2. If the address information #2 is the same as the address information #1, the NSSAAF determines that the identity of the second AAA-S is correct. If the address information #2 is not the same as the address information #1, the NSSAAF determines that the identity of the second AAA-S is incorrect.

It should be understood that another example method provided in the method 400 for determining whether the identity of the second AAA-S is correct is also applicable to the method 600. Details are not described again.

S640 to S660 in the method 600 are similar to S430 to S450 in the method 400. Details are not described herein again.

It should be noted that S630 in the method 600 may also be performed by an AAA-P. In this case, in S610, a security link between the AAA-P and the second AAA-S is established. Similarly, the AAA-P receives the first request message from the second AAA-S, where the first request message is used to request to perform network slice-specific re-authentication or network slice-specific authentication revocation on the terminal device (not shown in the figure), and the first request message includes the GPSI and the S-NSSAI. Then, the AAA-P determines whether the identity of the second AAA-S is correct. A specific procedure is similar to the procedure in which the NSSAAF determines whether the identity of the second AAA-S is correct in S630. Details are not described herein again in this application.

It should be understood that the verification method provided in the method 500 may also be combined with the method 600. In this case, the AAA-P performs a determining operation. For a specific verification method, refer to S520 to S550 in the method 500. Details are not described again.

Therefore, according to the communication method provided in this embodiment of this application, the security link between the NSSAAF and the AAA-S is established, so that communication between the NSSAAF and the AAA-S can be protected. Therefore, it is difficult for the attacker to request re-authentication, authentication revocation, or the like by forging real address information or identity information of the AAA-S.

Figure 7:
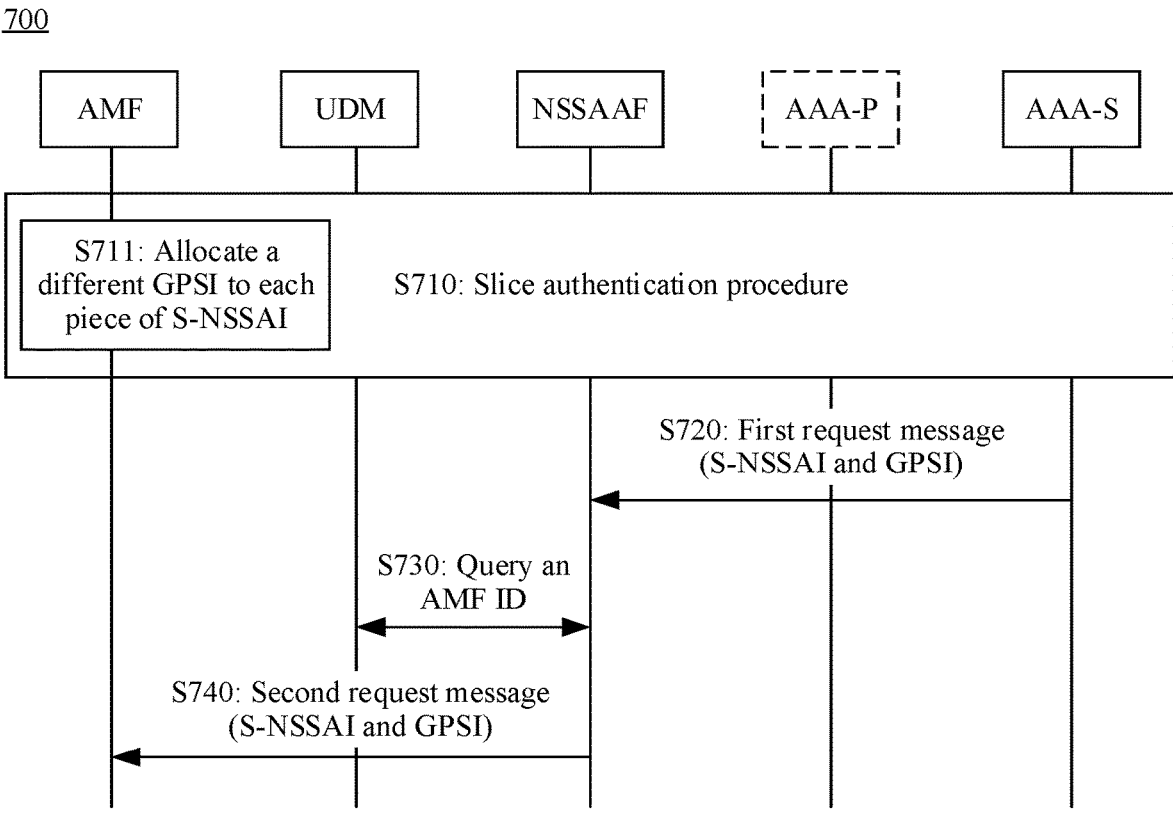
FIG. 7 is a schematic flowchart of a communication method according to still another embodiment of this application.

FIG. 7 is a schematic flowchart of a communication method 700 in a network slice scenario according to an embodiment of this application. As shown in FIG. 7, the method 700 includes the following steps.

S710: A network side completes a slice-specific authentication procedure.

It should be understood that S710 is similar to S410 in the method 400. For brevity, details are not described again.

In the slice-specific authentication procedure, in S711, an AMF allocates a different GPSI to each piece of S-NSSAI.

In an example, in the slice-specific authentication procedure, when initiating slice-specific authentication, the AMF temporarily allocates a GPSI in a format of an external identifier to a terminal device. The GPSI is different for each terminal device, each slice, and each access.

It should be noted that the GPSI in the format of the external identifier is allocated by an operator, and is an identifier associated with an international mobile subscriber identity (international mobile subscriber identity, IMSI) of the terminal device. There may be one or more GPSIs. The external identifier is in a format of username@realm, where username needs to include a local identifier, and realm needs to include a domain name. For example, in the slice-specific authentication procedure, the domain name may be address information or data network name (data network name, DNN) information of an AAA-S.

In another example, a UDM generates a GPSI based on a quantity of pieces of S-NSSAI accessed by a terminal device, where the quantity of generated GPSIs is greater than or equal to the quantity of pieces of S-NSSAI. In the slice-specific authentication procedure, the UDM sends all generated GPSIs and subscription information to the AMF. When determining, based on subscription data, S-NSSAI on which slice-specific authentication is performed, the AMF can obtain a GPSI to be used from the GPSI sent by the UDM. Because the quantity of GPSIs is greater than or equal to the quantity of pieces of S-NSSAI, different pieces of S-NSSAI correspond to different GPSIs.

S720 to S740 are similar to S630 to S650 in the method 600. For brevity, details are not described in this application again.

It should be understood that the method 700 may be implemented separately, or may be implemented in combination with another method, for example, implemented in combination In an example, after allocating the different GPSI to each piece of S-NSSAI, the AMF with the method 400, the method 500, or the method 600. verifies, according to any one of the method 400 to the method 600, whether address information #2 or identity information #2 of the AAA-S is correct. If the address information #2 or the identity information #2 of the AAA-S is correct, when receiving the S-NSSAI and the GPSI, the AMF verifies again whether the GPSI is correct. If the GPSI is correct, the procedure continues. If the GPSI is incorrect, the procedure ends.

In another example, an NSSAAF stores an association relationship among the GPSI, the S-NSSAI, and the address information of the AAA-S in the slice-specific authentication procedure or after the slice-specific authentication procedure is completed. The NSSAAF obtains a GPSI #2 from a first request message, and obtains a GPSI #1 corresponding to the S-NSSAI from a local storage based on the S-NSSAI. The NSSAAF compares the GPSI #1 with the GPSI #2. If the GPSI #1 is different from the GPSI #2, the NSSAAF terminates the procedure. If the GPSI #1 is the same as the GPSI #2, the NSSAAF verifies whether the address information #2 of the AAA-S is correct according to any one of the method 400 to the method 600. If the address information #2 of the AAA-S is correct, the procedure continues. If the address information #2 of the AAA-S is incorrect, the procedure ends.

Therefore, according to the communication method provided in this embodiment of this application, a different GPSI is allocated to each terminal device for each slice and each access, so that difficulty of masquerading by an attacker is greatly increased. In other words, a probability that S-NSSAI and a GPSI randomly generated by the attacker can be paired for use is greatly reduced, to improve system security.

An uncrewed aerial vehicle may perform an uncrewed aerial vehicle authentication and authorization (USS UAV authorization/authentication, UUAA) procedure with a UTM/USS over a 3GPP system. The UUAA procedure is used for mutual authentication and authorization between the UTM/USS and the UAV. The authentication and authorization are used to determine whether the UAV can send UAV-related service data (service data such as flight control, video backhaul, and UAV identification) to the UTM/USS. The authentication and authorization are also used to determine whether the UTM/USS is authorized to control flight of the UAV. The 3GPP network needs to determine whether a UAV-related service communication service can be provided for the UAV based on a UUAA result, including sending the UAV service data to the UTM/USS by the UAV over the 3GPP network, and controlling the flight of the UAV by the UTM/USS over the 3GPP network. After the UUAA procedure, if the USS/UTM determines that a UAV does not need to perform a UAV service, for example, when a flight certificate of the UAV expires or the USS/UTM detects that the UAV is a malicious user, the USS/UTM may revoke the UAV on which UAV authentication and authorization have been completed, to prevent the UAV from continuing to use the UAV service. Alternatively, after a pairing authentication and authorization procedure, the USS/UTM may revoke the UAV on which the UAV pairing authentication and authorization have been completed. For ease of description, in subsequent embodiments of this application, an example in which a USS/UTM revokes a UAV on which UAV authentication and authorization have been completed is used for description. A process of revoking a UAV on which UAV pairing authentication and authorization have been completed is similar. Details are not described again. For a UAV that is connected to the UTM/USS through the 3GPP and has completed UUAA with the UTM/USS over the 3GPP network, the UTM/USS needs to use a 3GPP UAV ID to trigger the 3GPP network to execute a UUAA revocation procedure on a UAV corresponding to the 3GPP UAV ID. The 3GPP UAV ID may be, for example, a GPSI allocated by the 3GPP network to the UAV. However, a malicious UTM/USS can obtain the 3GPP UAV ID allocated by the 3GPP network to the UAV from another place. For example, the malicious UTM/USS obtains the 3GPP UAV ID of the UAV through eavesdropping, and the malicious UTM/USS is an unauthorized UTM/USS. The malicious UTM/USS can pretend to be the UTM/USS serving the UAV and revoke the UUAA of the UAV only by sending the 3GPP UAV ID of the UAV. As a result, the authentication and authorization for the UAV may be revoked unexpectedly, and use of a related service is affected. Therefore, how to identify whether a UTM/USS is a malicious attacker is an urgent problem to be resolved currently.

Figure 8:
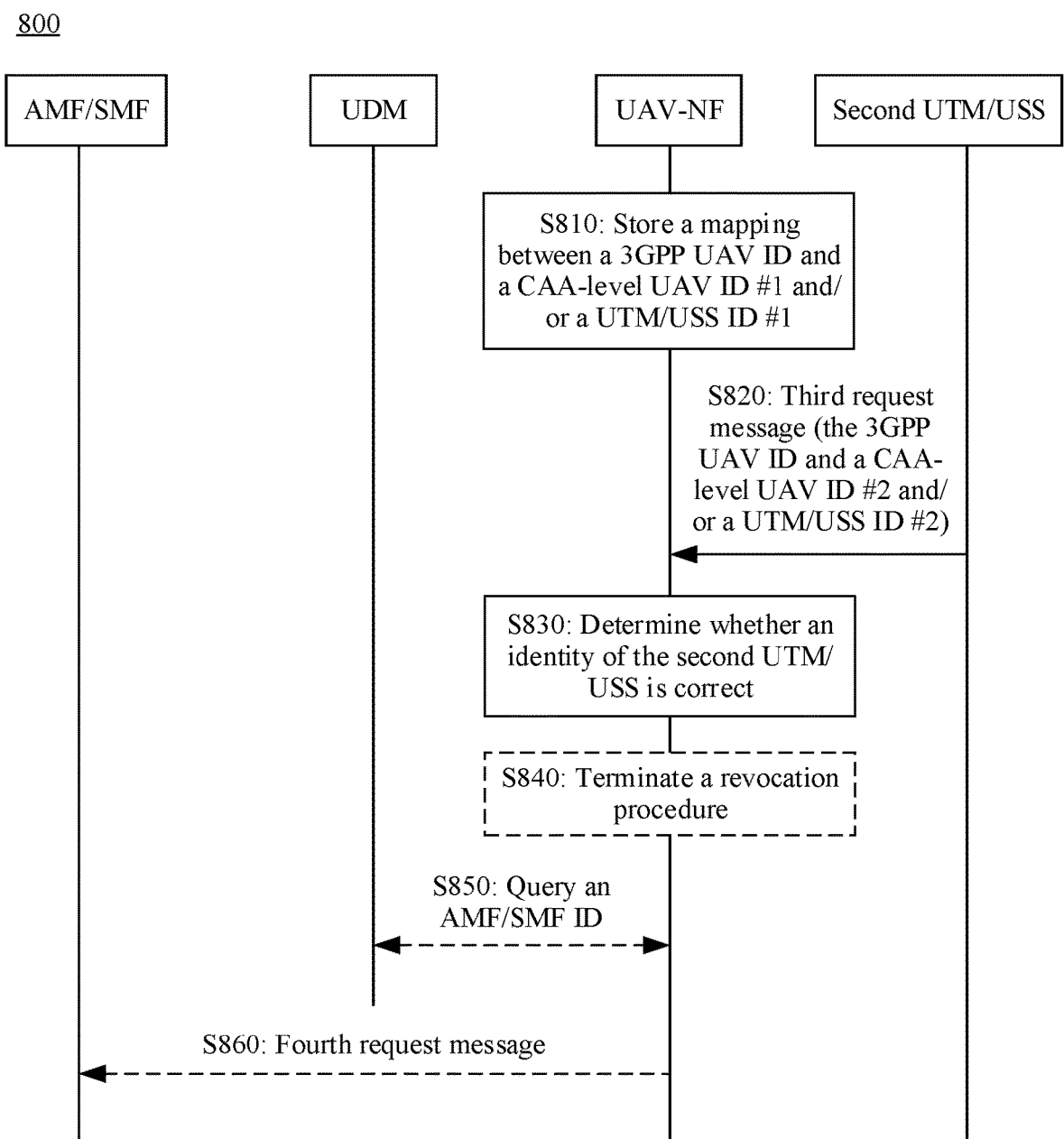
FIG. 8 is a schematic flowchart of a communication method according to still another embodiment of this application.

FIG. 8 is a schematic flowchart of a communication method 800 in an uncrewed aerial vehicle scenario according to an embodiment of this application.

It should be understood that before the method 800, a UAV performs uncrewed aerial vehicle registration with a first UTM/USS.

For example, the UAV (not shown in the figure) registers with a UTM/USS, and obtains a civil aviation authority level UAV identifier (civil aviation authority level UAV ID, CAA-Level UAV ID) in a registration procedure. The CAA-level UAV ID is an external identifier of a 3GPP network, and is issued by the civil aviation authority to uniquely identify the UAV.

It should be further understood that before the method 800, the UAV performs an uncrewed aerial vehicle authentication and authorization procedure/an uncrewed aerial vehicle pairing authentication and authorization procedure with the first UTM/USS.

Before accessing and using a UAS service through the 3GPP network, the UAV requests authentication and authorization for using the UAS service from the first USS/UTM, that is, executes a UUAA procedure. The UUAA procedure may be triggered by an AMF or an SMF.

In an example, the UAV carries the CAA-level UAV ID in the registration procedure, and the access and mobility management function (access and mobility management function, AMF) determines, based on the CAA-level UAV ID, subscription information of the UAV in a unified data management function (unified data management, UDM), and a local configuration of an operator, that UUAA needs to be performed. In the UUAA procedure, the AMF generates a 3GPP UAV ID for the UAV. The 3GPP UAV ID may be used to identify the UAV inside and/or outside the 3GPP network, and may be a GPSI.

In another example, the UAV carries the CAA-level UAV ID in a protocol data unit (protocol data unit, PDU) session establishment procedure, and the session management function (session management function, SMF) determines, based on the CAA-level UAV ID, subscription information of the UAV in a UDM, and a local configuration of an operator, that UUAA needs to be performed. In the UUAA procedure, the SMF generates a 3GPP UAV ID for the UAV. The 3GPP UAV ID may be used to identify the UAV inside and/or outside the 3GPP network, and may be a GPSI.

In the UUAA procedure, the AMF or SMF sends a UUAA request message to a UAV-NF. The message includes the 3GPP UAV ID and the CAA-level UAV ID.

The UAV-NF determines address information of the UTM/USS based on the CAA-level UAV ID. Specifically, for example, the UAV-NF determines a UTM/USS ID based on the CAA-level UAV ID, and then determines an address of the UTM/USS based on the UTM/USS ID.

If the UAV obtains the address information of the UTM/USS in S810, the UUAA request message may include the address information of the UTM/USS. In this case, the UAV-NF may obtain the address information of the UTM/USS from the UUAA request message without determining the address information of the UTM/USS based on the CAA-level UAV ID.

After the uncrewed aerial vehicle authentication and authorization procedure ends and the UAV and the UTM/USS successfully perform mutual authentication and authorization, the UTM/USS sends a UUAA reply message to the UAV-NF, where the UUAA reply message indicates that a UUAA result of the 3GPP network is a UUAA success. The UAV-NF sends a UUAA reply message to the AMF or the SMF, where the UUAA reply message indicates that a UUAA result is a UUAA success. As shown in FIG. 8, the method 800 includes the following steps.

S830: The UAV-NF stores a mapping between the 3GPP UAV ID and a CAA-level UAV ID #1 and/or a UTM/USS ID #1.

For example, in or after the uncrewed aerial vehicle registration procedure/the uncrewed aerial vehicle authentication and authorization procedure, the UAV-NF stores a mapping between the 3GPP UAV ID and the CAA-level UAV ID #1; the UAV-NF stores a mapping between the 3GPP UAV ID and the UTM/USS ID #1, where the UTM/USS ID #1 is an identity of the first UTM/USS; or, the UAV-NF stores the mapping among the 3GPP UAV ID, the CAA-level UAV ID #1, and the UTM/USS ID #1.

It should be understood that the first UTM/USS also stores a mapping between the 3GPP UAV ID and the CAA-level UAV ID and/or the UTM/USS ID.

For example, in or after the uncrewed aerial vehicle registration procedure and the uncrewed aerial vehicle authentication and authorization procedure, the first UTM/USS stores a mapping between the 3GPP UAV ID and the CAA-level UAV ID #1; the first UTM/USS stores a mapping between the 3GPP UAV ID and the UTM/USS ID #1; or, the first UTM/USS stores a mapping among the 3GPP UAV ID, the CAA-level UAV ID #1, and the UTM/USS ID #1.

It should be noted that, the UTM/USS ID #1 is information stored in preconfigured information of the UAV-NF or information based on preconfigured information, and the CAA-level UAV ID #1 may be the information stored in the preconfigured information of the UAV-NF. Therefore, it may be considered that the CAA-level UAV ID #1 and the UTM/USS ID #1 are real internal identifiers of the UTM/USS and real identifiers of the UTM/USS.

S820: A second UTM/USS sends a third request message to the UAV-NF, where the third request message includes the 3GPP UAV ID and a CAA-level UAV ID #2 and/or a UTM/USS ID #2, the UTM/USS ID #2 is an identity of the second UTM/USS, and the third request message is used to request to revoke uncrewed aerial vehicle authentication and authorization.

It should be noted that the second UTM/USS may be the same as or different from the first UTM/USS in the uncrewed aerial vehicle registration procedure and the uncrewed aerial vehicle authentication and authorization procedure. For example, the second UTM/USS is another unauthorized communication device such as a malicious attacker, and in this case, the second UTM/USS is not the same UTM/USS as the first UTM/USS.

S830: The UAV-NF determines whether an identity of the second UTM/USS is correct.

It should be understood that, that the UAV-NF determines whether an identity of the second UTM/USS is correct indicates that the UAV-NF determines whether the second UTM/USS is authorized to request to revoke the uncrewed aerial vehicle authentication and authorization. Specifically, it may be understood that the UAV-NF determines whether the second UTM/USS has an association relationship with the 3GPP UAV ID. If there is the association relationship, the second UTM/USS may legally initiate uncrewed aerial vehicle authentication and authorization revocation related to the 3GPP UAV ID. If there is no association relationship, the second UTM/USS may be considered as a malicious UTM/USS controlled by an attacker.

In an example, in S810, the UAV-NF stores the mapping between the 3GPP UAV ID and the CAA-level UAV ID #1. In S820, the third request message carries the 3GPP UAV ID and the CAA-level UAV ID #2. The UAV-NF obtains the 3GPP UAV ID and the CAA-level UAV ID #2 from the third request message, and obtains the CAA-level UAV ID #1 corresponding to the 3GPP UAV ID from a local storage based on the 3GPP UAV ID. The UAV-NF compares the CAA-level UAV ID #1 with the CAA-level UAV ID #2. If the CAA-level UAV ID #1 is the same as the CAA-level UAV ID #2, the UAV-NF determines that the identity of the second UTM/USS is correct. If the CAA-level UAV ID #1 is not the same as the CAA-level UAV ID #2, the UAV-NF determines that the identity of the second UTM/USS is incorrect.

In another example, in S810, the UAV-NF stores the mapping between the 3GPP UAV ID and the UTM/USS ID #1. In S840, the third request message carries the 3GPP UAV ID and the CAA-level UAV ID #2, or the third request message carries the 3GPP UAV ID and the UTM/USS ID #2. When the third request message carries the 3GPP UAV ID and the CAA-level UAV ID #2, the UAV-NF obtains the 3GPP UAV ID and the CAA-level UAV ID #2 from the third request message, and obtains the UTM/USS ID #2 corresponding to the CAA-level UAV ID #2 based on the CAA-level UAV ID #2. The UAV-NF obtains the UTM/USS ID #1 corresponding to the 3GPP UAV ID from a local storage based on the 3GPP UAV ID. The UAV-NF compares the UTM/USS ID #1 with the UTM/USS ID #2. If the UTM/USS ID #1 is the same as the UTM/USS ID #2, the UAV-NF determines that the identity of the second UTM/USS is correct. If the UTM/USS ID #1 is not the same as the UTM/USS ID #2, the UAV-NF determines that the identity of the second UTM/USS is incorrect. When the third request message carries the 3GPP UAV ID and the UTM/USS ID #2, the UAV-NF obtains the 3GPP UAV ID and the UTM/USS ID #2 from the third request message, and obtains the UTM/USS ID #1 corresponding to the 3GPP UAV ID from a local storage based on the 3GPP UAV ID. The UAV-NF compares the UTM/USS ID #1 with the UTM/USS ID #2. If the UTM/USS ID #1 is the same as the UTM/USS ID #2, the UAV-NF determines that the identity of the second UTM/USS is correct. If the UTM/USS ID #1 is not the same as the UTM/USS ID #2, the UAV-NF determines that the identity of the second UTM/USS is incorrect.

In still another example, in S810, the UAV-NF stores the mapping among the 3GPP UAV ID, the CAA-level UAV ID #1, and the UTM/USS ID #1. In S840, the third request message carries the 3GPP UAV ID and the CAA-level UAV ID #2, the third request message carries the 3GPP UAV ID and the UTM/USS ID #2, or the third request message carries the 3GPP UAV ID, the UTM/USS ID #2, and the CAA-level UAV ID #2. When the third request message carries the 3GPP UAV ID and the UTM/USS ID #2, the UAV-NF obtains the 3GPP UAV ID and the UTM/USS ID #2 from the third request message, and obtains the UTM/USS ID #1 corresponding to the 3GPP UAV ID from a local storage based on the 3GPP UAV ID. The UAV-NF compares the UTM/USS ID #1 with the UTM/USS ID #2. If the UTM/USS ID #1 is the same as the UTM/USS ID #2, the UAV-NF determines that the identity of the second UTM/USS is correct. If the UTM/USS ID #1 is not the same as the UTM/USS ID #2, the UAV-NF determines that the identity of the second UTM/USS is incorrect. When the third request message carries the 3GPP UAV ID and the CAA-level UAV ID #2, the UAV-NF obtains the 3GPP UAV ID and the CAA-level UAV ID #2 from the third request message, and obtains the CAA-level UAV ID #1 corresponding to the 3GPP UAV ID from a local storage based on the 3GPP UAV ID. The UAV-NF compares the CAA-level UAV ID #1 with the CAA-level UAV ID #2. If the CAA-level UAV ID #1 is the same as the CAA-level UAV ID #2, the UAV-NF determines that the identity of the second UTM/USS is correct. If the CAA-level UAV ID #1 is not the same as the CAA-level UAV ID #2, the UAV-NF determines that the identity of the second UTM/USS is incorrect. When the third request message carries the 3GPP UAV ID, the UTM/USS ID #2, and the CAA-level UAV ID #2, the UAV-NF obtains the 3GPP UAV ID, the UTM/USS ID #2, and the CAA-level UAV ID #2 from the third request message, and obtains the UTM/USS ID #1 and the CAA-level UAV ID #1 that are corresponding to the 3GPP UAV ID from a local storage based on the 3GPP UAV ID. The UAV-NF compares the UTM/USS ID #1 with the UTM/USS ID #2, and the UAV-NF compares the CAA-level UAV ID #1 with the CAA-level UAV ID #2. If the UTM/USS ID #1 is the same as the UTM/USS ID #2, and the CAA-level UAV ID #1 is also the same as the CAA-level UAV ID #2, the UAV-NF determines that the identity of the second UTM/USS is correct. If the UTM/USS ID #1 is not the same as the UTM/USS ID #2, or the CAA-level UAV ID #1 is not the same as the CAA-level UAV ID #2, the UAV-NF determines that the identity of the second UTM/USS is incorrect.

It should be understood that the identifier carried in the third request message in S820 needs to be stored in at least the first UTM/USS. For example, the third request message carries the 3GPP UAV ID and the CAA-level UAV ID #2. In this case, the first UTM/USS stores the mapping between the 3GPP UAV ID and the CAA-level UAV ID #1 in or after the uncrewed aerial vehicle registration procedure and the uncrewed aerial vehicle authentication and authorization procedure. Alternatively, the UTM/USS stores the mapping among the 3GPP UAV ID, the CAA-level UAV ID #1, and the UTM/USS ID #1.

Optionally, in S840, when the UAV-NF determines that the identity of the second UTM/USS is incorrect, the UAV-NF terminates a UUAA revocation procedure. For example, when the UAV-NF determines that the identity of the second UTM/USS is incorrect, the UAV-NF directly discards the third request message. For another example, when the UAV-NF determines that the identity of the second UTM/USS is incorrect, the UAV-NF sends a third response message to the UTM/USS. The third response message includes the 3GPP UAV ID and/or the CAA-level UAV ID, and the first response message indicates that UUAA revocation fails.

When the UAV-NF determines that the identity of the second UTM/USS is correct, the UAV-NF continues to perform the UUAA revocation procedure. For example, in S850, the UAV-NF requests to query an AMF ID or an SMF ID from the UDM, where a request message may carry the 3GPP UAV ID and/or subscription permanent identifier (subscription permanent identifier, SUPI) information of the UAV. The UDM queries, based on the 3GPP UAV ID and/or a SUPI of the UAV, the AMF ID or the SMF ID that serves the UAV The UAV-NF determines, based on the AMF ID or the SMF ID, an AMF or an SMF that serves a terminal device, and sends a fourth request message to the AMF or the SMF in S860. The fourth request message is used to revoke UUAA. The AMF or the SMF revokes the UUAA based on the fourth request message.

Therefore, according to the communication method provided in this embodiment of this application, the third request message sent by the UTM/USS to the UAV-NF carries the CAA-level UAV ID and/or the UTM/USS ID, and the CAA-level UAV ID and/or the UTM/USS ID are/is verified to determine whether the identity of the UTM/USS is correct. This reduces cases in which the authentication and authorization for the uncrewed aerial vehicle is revoked resulting from requests of an attacker. To be specific, according to the communication method provided in this embodiment of this application, the UAV-NF is allowed to detect whether the identity of the UTM/USS that sends an authentication and authorization revocation request is correct, that is, detect whether the UTM/USS is an authorized UTM/USS. This reduces the cases in which the authentication and authorization for the uncrewed aerial vehicle is unexpectedly revoked resulting from requests of an attacker, and improves system security.

Figure 9:
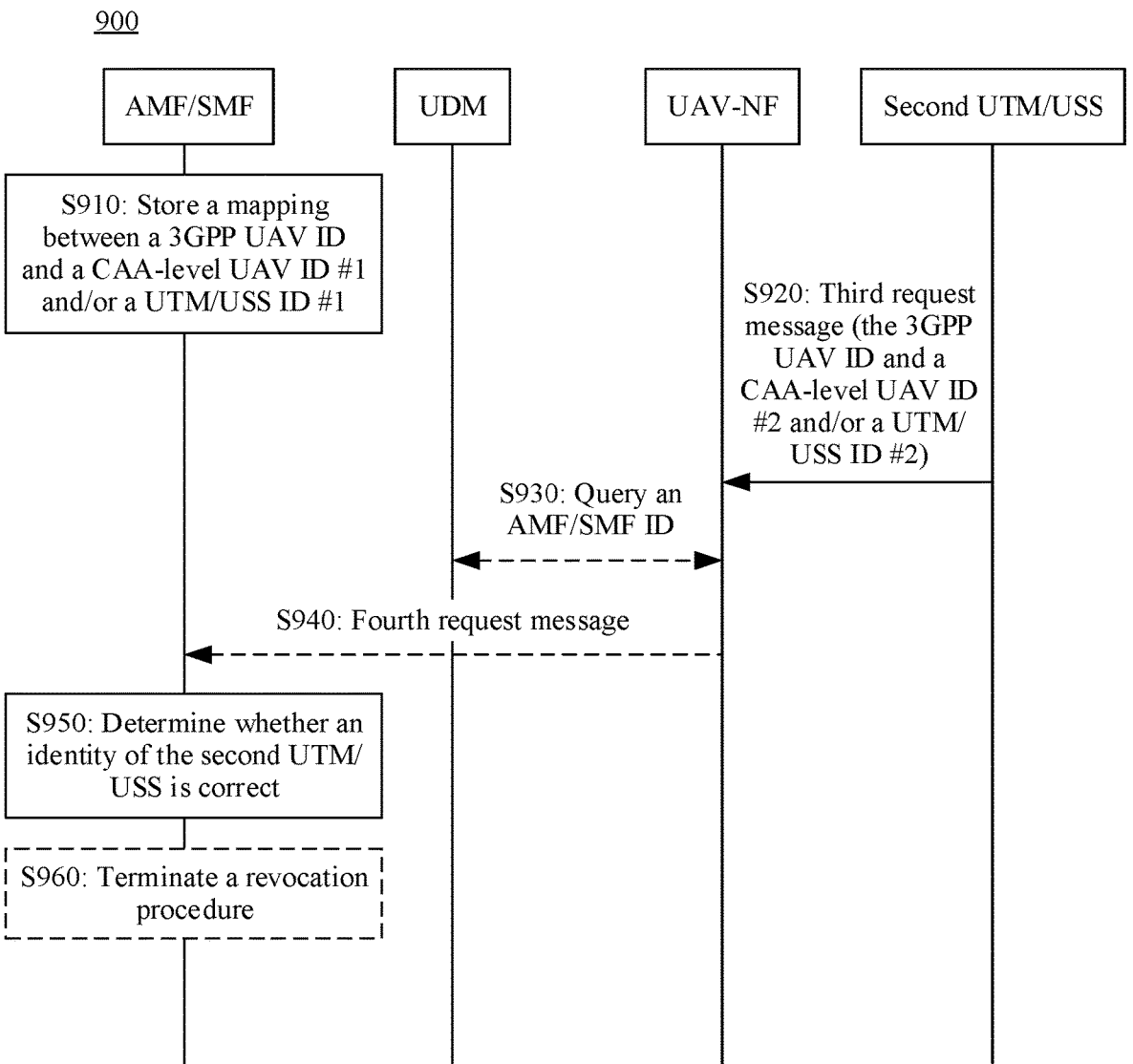
FIG. 9 is a schematic flowchart of a communication method according to still another embodiment of this application.

FIG. 9 is a schematic flowchart of a communication method 900 in an uncrewed aerial vehicle scenario according to an embodiment of this application. It should be understood that, before the method 900, a UAV performs uncrewed aerial vehicle registration and uncrewed aerial vehicle authentication and authorization with a first UTM/USS. A specific procedure is similar to the uncrewed aerial vehicle registration and uncrewed aerial vehicle authentication and authorization procedures described in the method 800. Details are not described herein in this application.

As shown in FIG. 9, the method includes the following steps.

S910: An AMF or an SMF stores a mapping between a 3GPP UAV ID and a CAA-level UAV ID #1 and/or a UTM/USS ID #1. The first UTM/USS also stores the mapping between the 3GPP UAV ID and the CAA-level UAV ID #1 and/or the UTM/USS ID #1. A specific solution is similar to S830 in the method 800. Details are not described again.

S920: A second UTM/USS sends a third request message to a UAV-NF.

Optionally, in S940, when the second UTM/USS carries the 3GPP UAV ID and a CAA-level UAV ID #2 but does not carry a UTM/USS ID #2 in the third request message, the UAV-NF obtains the CAA-level UAV ID #2 from the third request message, and obtains the UTM/USS ID #2 corresponding to the CAA-level UAV ID #2 based on the CAA-level UAV ID #2. It should be understood that S920 is similar to S820 in the method 800, and the example solution in S820 is also applicable to S920. For brevity, details are not described again.

S930: The UAV-NF requests to query an AMF ID or an SMF ID from a UDM, where a request message may carry the 3GPP UAV ID and/or SUPI information of the UAV. The UDM queries, based on the 3GPP UAV ID and/or a SUPI of the UAV, the AMF ID or the SMF ID that serves the UAV. The UAV-NF determines, based on the AMF ID or the SMF ID, an AMF or an SMF that serves a terminal device, and sends a fourth request message to the AMF or the SMF in S940. The fourth request message is used to revoke UUAA. Optionally, in S940, when the second UTM/USS carries the 3GPP UAV ID and the CAA-level UAV ID #2, but does not carry the UTM/USS ID #2 in the third request message, the UAV-NF obtains the CAA-level UAV ID #2 from the third request message, and obtains the UTM/USS ID #2 corresponding to the CAA-level UAV ID #2 based on the CAA-level UAV ID #2, in this case, the fourth request message also carries the UTM/USS ID #2.

S950: The AMF or the SMF determines whether an identity of the UTM/USS is correct.

S950 in the method 900 is similar to S830 in the method 800, and a difference lies in that the UAV-NF is replaced with the AMF or the SMF, and the third request message is replaced with the fourth request message. For brevity, details are not described again.

Optionally, in S950, when the AMF or the SMF determines that the identity of the UTM/USS is incorrect, the UAV-NF terminates a UUAA revocation procedure. When the AMF or the SMF determines that the identity of the UTM/USS is correct, the UAV-NF continues to perform a UUAA revocation procedure.

Therefore, according to the communication method provided in this embodiment of this application, the AMF or the SMF verifies, in an authentication and authorization revocation procedure, whether the identity of the UTM/USS is correct, to reduce cases in which authentication and authorization for the uncrewed aerial vehicle is revoked resulting from requests of an attacker.

Figure 10:
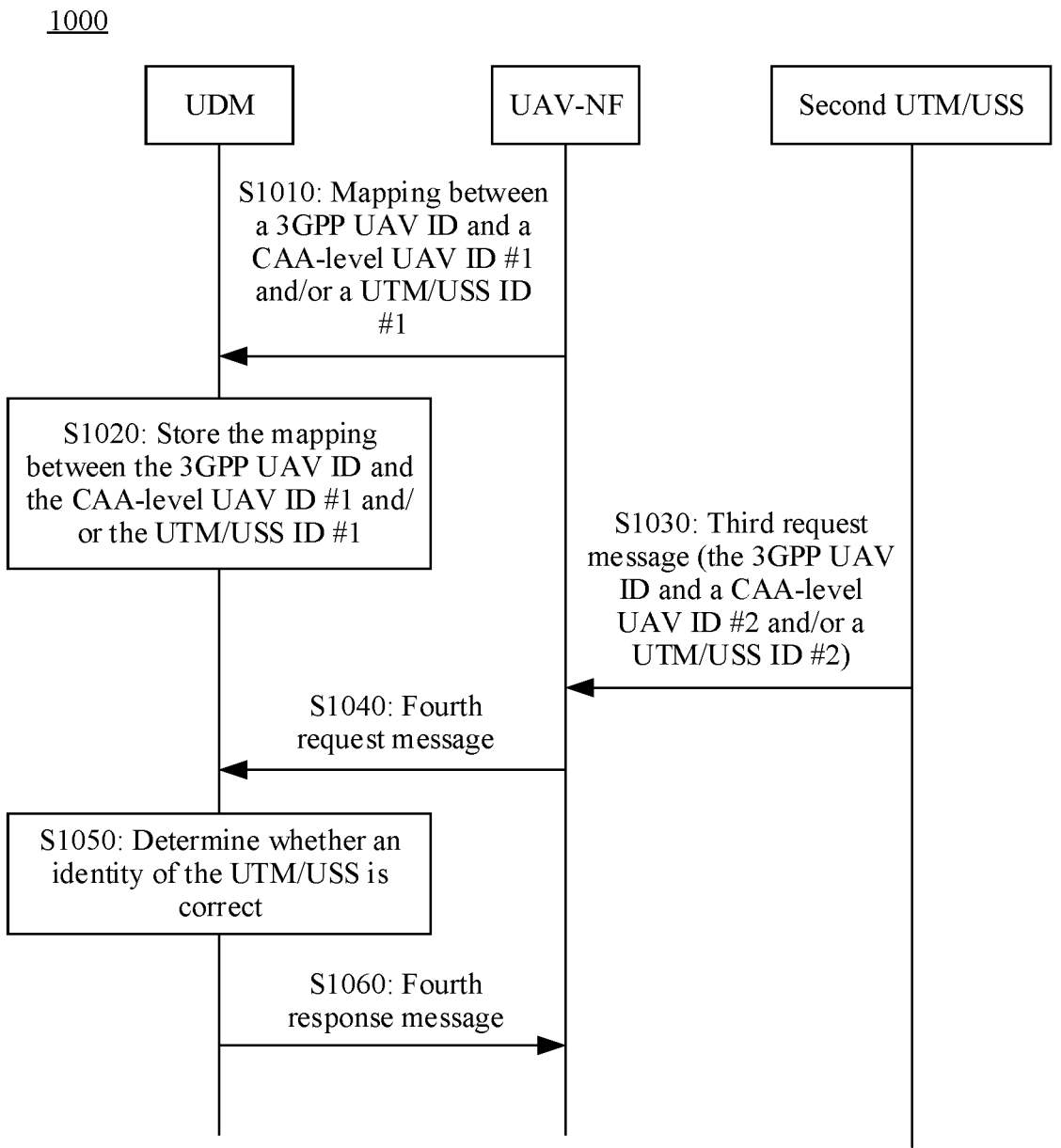
FIG. 10 is a schematic flowchart of a communication method according to still another embodiment of this application.

FIG. 10 is a schematic flowchart of a communication method 1000 in an uncrewed aerial vehicle scenario according to an embodiment of this application.

It should be understood that, before the method 1000, a UAV performs uncrewed aerial vehicle registration and uncrewed aerial vehicle authentication and authorization with a first UTM/USS. A specific procedure is similar to the uncrewed aerial vehicle registration and uncrewed aerial vehicle authentication and authorization procedures described in the method 800. Details are not described herein in this application.

As shown in FIG. 10, the method 1000 includes the following steps.

S1010: A UAV-NF sends a mapping between a 3GPP UAV ID and a CAA-level UAV ID #1 and/or a UTM/USS ID #1 to a UDM.

For example, the UAV-NF sends a registration request message to the UDM. The registration request message includes the mapping between the 3GPP UAV ID and the CAA-level UAV ID #1 and/or the UTM/USS ID #1. The registration request message is used to request to register the mapping between the 3GPP UAV ID and the CAA-level UAV ID #1 and/or the UTM/USS ID #1 with the UDM. Correspondingly, the UDM receives the registration request message, and in S1020, the UDM stores the mapping between the 3GPP UAV ID and the CAA-level UAV ID #1 and/or the UTM/USS ID #1. It should be understood that the first UTM/USS also stores the mapping between the 3GPP UAV ID and the CAA-level UAV ID #1 and/or the UTM/USS ID #1 in or after the uncrewed aerial vehicle registration procedure and the uncrewed aerial vehicle authentication and authorization procedure.

S1030: A UTM/USS sends a third request message to the UAV-NF, where the third request message includes the 3GPP UAV ID and the CAA-level UAV ID #2 and/or the UTM/USS ID #2, and the third request message is used to request to revoke the uncrewed aerial vehicle authentication and authorization.

S1040: The UAV-NF sends a fourth request message to the UDM, where the fourth request message includes the 3GPP UAV ID and the CAA-level UAV ID #2, and/or the UTM/USS ID #2, and the fourth request message is used to request to revoke the uncrewed aerial vehicle authentication and authorization.

It should be noted that, in S1020, the UDM stores the mapping between the 3GPP UAV ID and the UTM/USS ID #1, where the mapping does not include the CAA-level UAV ID #1. In S1060, the third request message carries the 3GPP UAV ID and the CAA-level UAV ID #2 and does not carry the UTM/USS ID #2. After receiving the third request message in S1030, the UAV-NF obtains the 3GPP UAV ID and the CAA-level UAV ID #2 from the third request message, determines the UTM/USS ID #2 corresponding to the CAA-level UAV ID #2 based on the CAA-level UAV ID #2, and then sends the fourth request message to the UDM in S1040, where the fourth request message carries the 3GPP UAV ID and the UTM/USS ID #2.

S1050: The UDM determines whether an identity of the second UTM/USS is correct.

S1050 is similar to S830 in the method 800, and a difference lies in that the UAV-NF is replaced with the UDM. Details are not described herein again in this application.

Optionally, the UDM sends a fourth response message to the UAV-NF, where the fourth response message is used to feed back a verification result of the identity of the UTM/USS.

Optionally, when the UAV-NF determines that the identity of the UTM/USS is incorrect, the UAV-NF terminates a UUAA revocation procedure. When the UAV-NF determines that the identity of the UTM/USS is correct, the UAV-NF continues to perform a UUAA revocation procedure.

Therefore, according to the communication method provided in this embodiment of this application, the UDM verifies, in an authentication and authorization revocation procedure, whether the identity of the UTM/USS is correct, to reduce cases in which authentication and authorization for the uncrewed aerial vehicle is unexpectedly revoked resulting from requests of an attacker.

FIG. 11 is a schematic flowchart of a communication method 1100 in an uncrewed aerial vehicle scenario according to an embodiment of this application.

It should be understood that, before the method 1100, a UAV performs uncrewed aerial vehicle registration and uncrewed aerial vehicle authentication and authorization with a UTM/USS. A specific procedure is similar to the uncrewed aerial vehicle registration and uncrewed aerial vehicle authentication and authorization procedures described in the method 800. Details are not described herein in this application.

As shown in FIG. 11, the method 1100 includes the following steps.

S1110: An AMF or an SMF stores a mapping between a 3GPP UAV ID and a CAA-level UAV ID #1 and/or a UTM/USS ID #1. The UTM/USS also stores the mapping between the 3GPP UAV ID and the CAA-level UAV ID #1 and/or the UTM/USS ID #1. A specific solution is similar to S830 in the method 800. Details are not described again.

S1120 in the method 1100 is similar to S920 in the method 900. Details are not described again.

S1130: A UAV-NF determines whether a TLS link has been established between the UAV-NF and the UTM/USS and whether integrity protection is enabled.

It should be noted that, if the UAV-NF communicates with the UTM/USS via a network exposure function (network exposure function, NEF), the NEF establishes a TLS link to the UTM/USS. If the UAV-NF and NEF are co-located or a same network element has the functions of the NEF and the UAV-NF, the UAV-NF establishes a TLS link to the UTM/USS. When the same network element has the functions of the NEF and the UAV-NF, in the method 1100, the UAV-NF is used to represent the network element. The establishing a TLS link may include: during network establishment, establishing the TLS link to the UTM/USS by the UAV-NF based on a device pre-configuration or manual triggering, establishing the TLS link when the UTM/USS and the UAV-NF communicate with a peer end for the first time, or establishing the security link when the UTM/USS and UAV-NF communicate with the peer end again.

When the TLS link has been established between the UAV-NF and the UTM/USS, and the integrity protection and/or confidentiality protection have/has been enabled, it may be considered that communication between the UAV-NF and the UTM/USS is securely protected, and an attacker cannot masquerade as the UTM/USS to request to revoke UUAA.

Optionally, when the TLS link is established between the UAV-NF and the UTM/USS, the integrity protection and/or confidentiality protection are/is forcibly enabled, that is, a non-null (NULL) integrity and/or algorithm are/is selected.

When the UAV-NF determines that the TLS link has been established between the UAV-NF and the UTM/USS, and the integrity protection has been enabled, the UAV-NF continues a revocation procedure without an additional verification procedure. For example, when the UAV-NF determines that the TLS link has been established between the UAV-NF and the UTM/USS, and the integrity protection has been enabled, the UAV-NF requests to query an AMF ID or an SMF ID from a UDM in S1160, determines, based on the AMF ID or the SMF ID, an AMF or an SMF serving a terminal device, and sends a fourth request message to the AMF or the SMF in S1170. The fourth request message is used to revoke UUAA. The AMF or the SMF revokes the UUAA based on the fourth request message. Otherwise, the UAV-NF terminates a revocation procedure, or any one of the method 800 to the method 1000 is used to verify an identity of the UTM/USS.

Optionally, the UAV-NF obtains a UTM/USS ID #2 of the UTM/USS and identification information of the TLS link in a process of establishing the TLS link to the UTM/USS, and stores an association relationship between an identifier of the TLS link and the UTM/USS ID #2 after successfully establishing the TLS link to the UTM/USS. The UAV-NF obtains the 3GPP UAV ID after receiving, over the TLS link, a third request message that carries the 3GPP UAV ID and that is sent by the UTM/USS. The UAV-NF obtains the UTM/USS ID #2 based on the identifier of the TLS link. The UTM/USS obtains the UTM/USS ID #1 based on the 3GPP UAV ID. A specific manner is similar to that in the method 800 to the method 1000. Details are not described again. The UAV-NF compares the UTM/USS ID #1 with the UTM/USS ID #2. If the UTM/USS ID #1 is the same as the UTM/USS ID #2, the UAV-NF determines that the identity of the UTM/USS is correct. If the UTM/USS ID #1 is not the same as the UTM/USS ID #2, the UAV-NF determines that the identity of the UTM/USS is incorrect.

Therefore, according to the communication method provided in this embodiment of this application, a UAV authentication revocation procedure is performed when it is determined that the TLS link has been established between the UAV-NF and the UTM/USS, and the integrity protection is enabled. Otherwise, the identity of the UTM/USS needs to be verified. This reduces cases in which authentication and authorization for the uncrewed aerial vehicle is unexpectedly revoked resulting from requests of an attacker.

Figure 12:
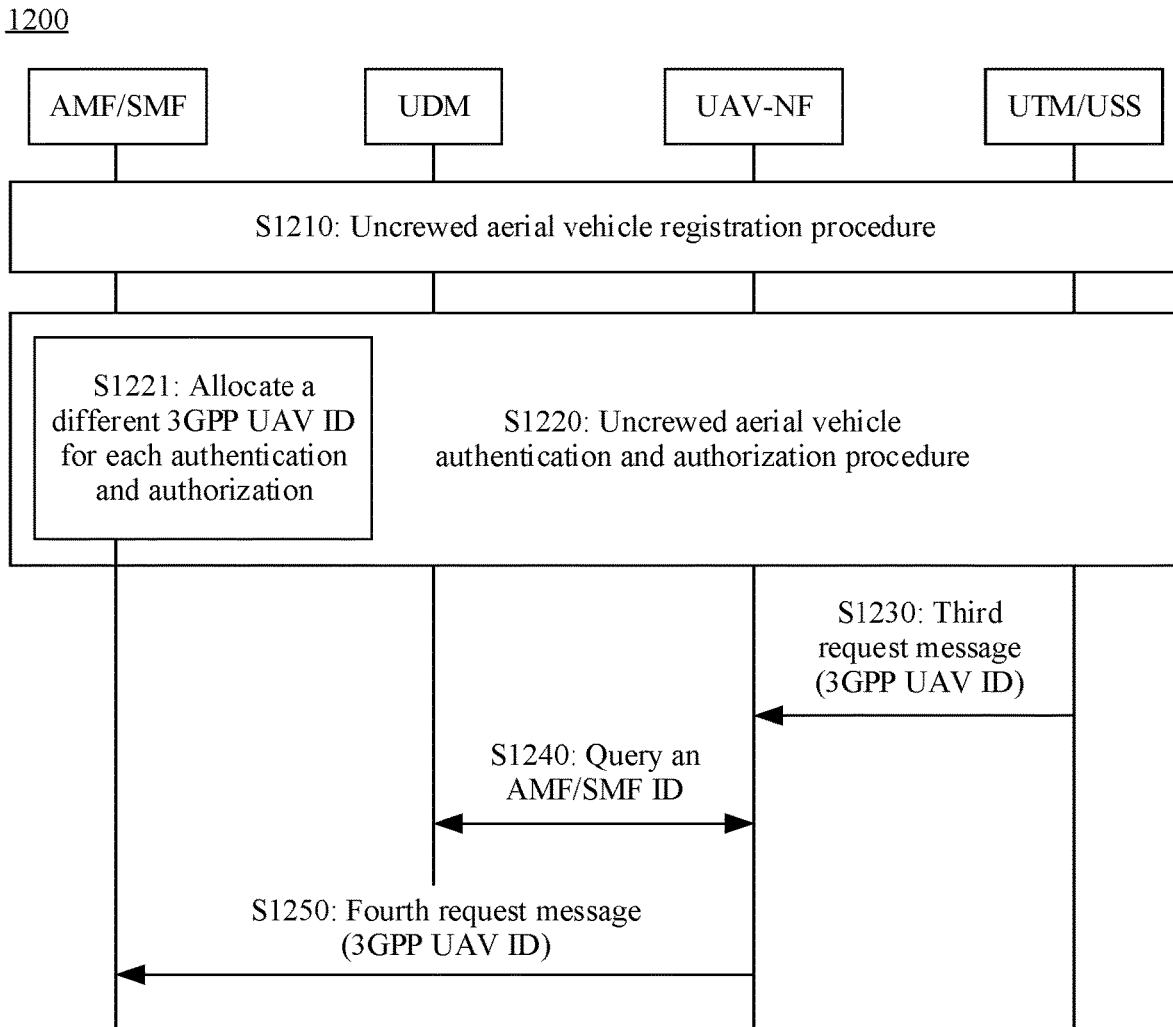
FIG. 12 is a schematic flowchart of a communication method according to still another embodiment of this application.

FIG. 12 is a schematic flowchart of a communication method 1200 in an uncrewed aerial vehicle scenario according to an embodiment of this application. As shown in FIG. 12, the method 1200 includes the following steps.

S1210 and S1220 in the method 1200 are similar to the uncrewed aerial vehicle registration procedure and the uncrewed aerial vehicle authentication and authorization procedure in the method 800. Details are not described again.

In the uncrewed aerial vehicle authentication and authorization procedure, in 51221, an AMF or an SMF allocates different 3GPP UAV IDs to different terminal devices in the uncrewed aerial vehicle authentication and authorization procedure.

For example, in the uncrewed aerial vehicle authentication and authorization procedure, when initiating uncrewed aerial vehicle authentication and authorization, the AMF or the SMF temporarily allocates a GPSI in a format of an external identifier to the terminal device. The GPSI is different for each access of each terminal device, and the GPSI is used as a 3GPP UAV ID.

S1230 to S1250 are similar to S920 to S940 in the method 900. For brevity, details are not described in this application again.

It should be understood that the method 1200 may be implemented separately, or may be implemented in combination with another method. This is not limited in this application.

Therefore, according to the communication method provided in this embodiment of this application, a different 3GPP UAV ID is allocated for each access of each terminal device, so that difficulty of masquerading by an attacker is greatly increased, to improve system security.

The methods provided in embodiments of this application are described above in detail with reference to FIG. 3 to FIG. 12. Apparatuses provided in embodiments of this application are described below in detail with reference to FIG. 13 and FIG. 14.

Figure 13:
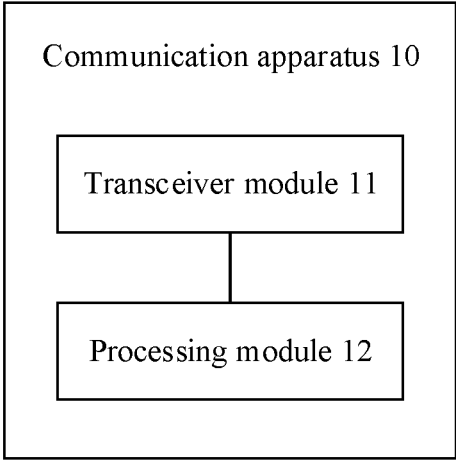
FIG. 13 is a schematic block diagram of an example communication apparatus according to this application.

FIG. 13 is a schematic block diagram of a communication apparatus 10 according to an embodiment of this application. As shown in FIG. 13, the communication apparatus 10 may include a transceiver module 11 and a processing module 12.

In a possible design, the communication apparatus 10 may correspond to the first element, the NSSAAF, the AAA-P, the UAV-NF, or the AMF/SMF in the foregoing method embodiments.

For example, the communication apparatus 10 may correspond to the first network element in the method 300, the NSSAAF in the methods 400, 600, and 700, the AAA-P in the method 500, the UAV-NF in the methods 800, 1100, and

1200, the AMF/SMF in the method 900, or the UDM in the method 1000 in embodiments of this application. The communication apparatus 10 may include a module, configured to perform the method performed by the first network element, the NSSAAF, the AAA-P, the UAV-NF, or the AMF/SMF in the method 300 in FIG. 3, the method 400 in FIG. 4, the method 500 in FIG. 5, the method 600 in FIG. 6, the method 700 in FIG. 7, the method 800 in FIG. 8, the method 900 in FIG. 9, the method 1000 in FIG. 10, the method 1100 in FIG. 11, or the method 1200 in FIG. 12. In addition, the units in the communication apparatus 10 and the foregoing other operations and/or functions are separately used to implement corresponding procedures of the method 300 to the method 1200. The transceiver module 11 in the communication apparatus 10 performs receiving and sending operations performed by the first network element, the NSSAAF, the AAA-P, the UAV-NF, or the AMF/SMF in the foregoing method embodiments, and the processing module 12 performs an operation other than the receiving and sending operations.

In another possible design, the communication apparatus 10 may correspond to the third network element, the AAA-S, or the UTM/USS in the foregoing method embodiments.

For example, the communication apparatus 20 in FIG. 13 may correspond to the third network element in the method 300, the AAA-S in the method 400 to the method 700, or the UTM/USS in the method 800 to the method 1200 in embodiments of this application. The communication apparatus 20 may include a module, configured to perform the method performed by the third network element, the AAA-S, or the UTM/USS in the method 300 in FIG. 3, the method 400 in FIG. 4, the method 500 in FIG. 5, the method 600 in FIG. 6, the method 700 in FIG. 7, the method 800 in FIG. 8, the method 900 in FIG. 9, the method 1000 in FIG. 10, the method 1100 in FIG. 11, or the method 1200 in FIG. 12. In addition, the units in the communication apparatus 20 and the foregoing other operations and/or functions are separately used to implement corresponding procedures of the method 200 to the method 1000.

The transceiver module 21 in the communication apparatus 20 performs receiving and sending operations performed by the third network element, the AAA-S, or the UTM/USS in the foregoing method embodiments, and the processing module 22 performs an operation other than the receiving and sending operations.

Figure 14:
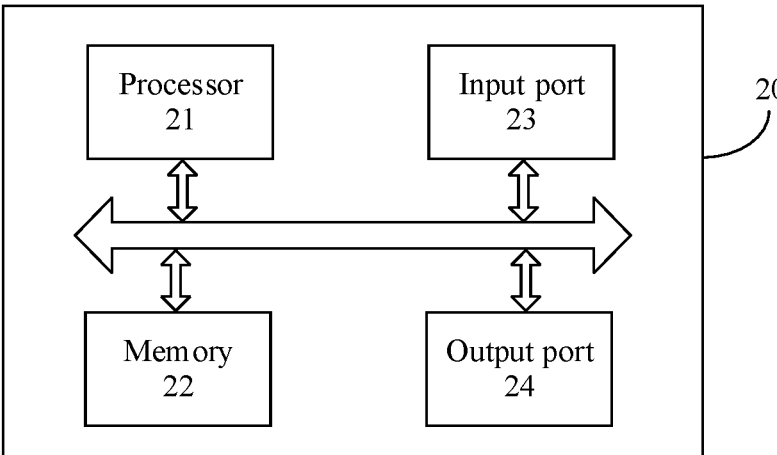
FIG. 14 is a schematic block diagram of another example communication apparatus according to this application.

According to the foregoing method, in a possible design, FIG. 14 is a schematic diagram of a communication apparatus 20 according to an embodiment of this application. As shown in FIG. 14, the apparatus 20 may be a communication apparatus such as a network device, and includes the first network element, the NSSAAF, the AAA-P, the UAV-NF, the AMF/SMF, or the like in the foregoing method embodiments.

According to the foregoing method, in another possible design, FIG. 14 is a schematic diagram of a communication apparatus 20 according to an embodiment of this application. The communication apparatus 40 may be the third network element, the AAA-S, the UTM/USS, or the like in the foregoing method embodiments.

The apparatus 20 may include a processor 21 (namely, an example of a processing module) and a memory 22. The memory 22 is configured to store instructions, and the processor 21 is configured to execute the instructions stored in the memory 22, so that the apparatus 30 implements the steps performed in the methods corresponding to FIG. 3 to FIG. 12.

Further, the apparatus 20 may further include an input port 24 (namely, an example of a transceiver module) and an output port 24 (namely, another example of a transceiver module). Further, the processor 21, the memory 22, the input port 23, and the output port 24 may communicate with each other through an internal connection path, to transmit a control signal and/or a data signal. The memory 22 is configured to store a computer program. The processor 21 may be configured to invoke the computer program from the memory 22 and run the computer program, to control the input port 23 to receive a signal and control the output port 24 to send a signal, so as to complete the steps of the network device in the foregoing methods. The memory 22 may be integrated into the processor 21, or the memory 22 and the processor 21 may be disposed separately.

Optionally, if the communication apparatus 20 is a communication device, the input port 23 is a receiver, and the output port 24 is a transmitter. The receiver and the transmitter may be a same physical entity or different physical entities. When the receiver and the transmitter are a same physical entity, the receiver and the transmitter may be collectively referred to as a transceiver.

Optionally, if the communication apparatus 20 is a chip or a circuit, the input port 23 is an input interface, and the output port 24 is an output interface.

In an implementation, it may be considered that functions of the input port 23 and the output port 24 are implemented by using a transceiver circuit or a dedicated transceiver chip. It may be considered that the processor 21 is implemented by using a dedicated processing chip, a processing circuit, a processor, or a general-purpose chip.

In another implementation, it may be considered that the communication device provided in this embodiment of this application is implemented by using a general-purpose computer. To be specific, program code for implementing functions of the processor 21, the input port 23, and the output port 24 is stored in the memory 22. A general-purpose processor implements the functions of the processor 31, the input port 23, and the output port 24 by executing the code in the memory 22.

For concepts, explanations, detailed descriptions, and other steps that are related to the technical solutions provided in embodiments of this application and that are related to the apparatus 20, refer to descriptions about the content in the foregoing methods or other embodiments. Details are not described herein again.

An embodiment of this application further provides a computer-readable storage medium. The computer-readable storage medium stores computer instructions used to implement the method performed by the network device in the foregoing method embodiments.

For example, when the computer program is executed by a computer, the computer is enabled to implement the method performed by the network device in the foregoing method embodiments.

An embodiment of this application further provides a computer program product including instructions. When the instructions are executed by a computer, the computer is enabled to implement the method performed by the first device or the method performed by the second device in the foregoing method embodiments.

An embodiment of this application further provides a communication system. The communication system includes the network device in the foregoing embodiments.

For explanations and beneficial effects of related content in any apparatus provided above, refer to the corresponding method embodiments provided above. Details are not described herein again.

In this embodiment of this application, the network device may include a hardware layer, an operating system layer running on the hardware layer, and an application layer running on the operating system layer. The hardware layer may include hardware such as a central processing unit (central processing unit, CPU), a memory management unit (memory management unit, MMU), and a memory (also referred to as a main memory). An operating system at the operating system layer may be any one or more computer operating systems that implement service processing through a process (process), for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be a network device, or a functional module that is in the network device and that can invoke and execute a program.

Aspects or features of this application may be implemented as a method, an apparatus, or a product that uses standard programming and/or engineering technologies. The term "product" used in this specification may cover a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that, the processor mentioned in embodiments of this application may be a central processing unit (central processing unit, CPU), or may further be another general-purpose processor, a digital signal processor (digital signal processor, DSP), an application-specific integrated circuit (application-specific integrated circuit, ASIC), a field-programmable gate array (field-programmable gate array, FPGA) or another programmable logic device, a discrete gate or transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or transistor logic device, or a discrete hardware component, the memory (storage module) may be integrated into the processor.

It should further be noted that the memory described in this specification aims to include but is not limited to these memories and any memory of another proper type.

A person of ordinary skill in the art may be aware that, in combination with the examples described in embodiments disclosed in this specification, units and methods may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed apparatuses and methods may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electronic form, a mechanical form, or another form.

The units described as separate components may or may not be physically separate, and components displayed as units may or may not be physical units. To be specific, the components may be located at one location, or may be distributed on a plurality of network units. Some or all of the units may be selected based on actual requirements to implement the solutions provided in this application.

In addition, function units in embodiments of this application may be integrated into one unit, each of the units may exist alone physically, or two or more units are integrated into one unit.

All or some of the foregoing embodiments may be implemented by using software, hardware, firmware, or any combination thereof. When software is used to implement the embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk (SSD))), or the like. For example, the foregoing usable medium may include but is not limited to any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. A communication method, comprising:
receiving, by a first network element, a first request message from a second network element through a security link between the first network element and the second network element, wherein the first request message is used to request to perform a first operation on a first terminal device; and
determining, by the first network element based on the first request message, whether the second network element is authorized to request to perform the first operation on the first terminal device, wherein the determining comprises:
obtaining, by the first network element, a first identifier associated with the first terminal device from the first request message; and determining, by the first network element, whether a third identifier associated with the first identifier is the same as a fourth identifier that is associated with the second network element and the security link, wherein the fourth identifier is obtained during establishment of the security link or after establishment of the security link.

2. The method of claim 1, wherein the first operation comprises authentication and authorization revocation or pairing authentication and authorization revocation.

3. The method of claim 2, wherein before the receiving, by the first network element, the first request message from the second network element, the method further comprises:

performing, by the first network element, a second operation on the first terminal device, wherein the second operation is authentication and authorization.

4. The method of claim 1, wherein the determining, by the first network element, whether the third identifier associated with the first identifier is the same as the fourth identifier comprises: determining, by the first network element, the third identifier based on the first identifier and a mapping between the third identifier and the first identifier.

5. The method of claim 4, wherein the third identifier is an identity identifier of a third network element, and the mapping indicates that the third network element is authorized to perform the first operation on the first terminal device.

6. The method of claim 5, further comprising:

storing the mapping in or after an uncrewed aerial vehicle registration procedure or an uncrewed aerial vehicle authentication and authorization procedure.

7. The method of claim 1, wherein the forth identifier comprises an identity identifier of the second network element; and the first identifier comprises an identity identifier of the first terminal device.

8. The method of claim 1, wherein the first network element is an uncrewed aerial vehicle network function, the second network element is an uncrewed aerial system traffic management network function or an unmanned aerial system service supplier, and the first terminal device is an uncrewed aerial vehicle.

9. The method of claim 1, further comprising:

when the first network element determines that the third identifier is the same as the fourth identifier, performing, by the first network element, the first operation; or when the first network element determines that the third identifier is different from the fourth identifier, terminating, by the first network element, the first operation.

10. An apparatus, comprising:

at least one processor; and at least one memory coupled to the at least one processor and storing programming instructions, that executed by the at least one processor, cause the apparatus to perform operations comprising:

receiving a first request message from a second network element through a security link between the first network element and the second network element, wherein the first request message is used to request to perform a first operation on a first terminal device; and determining, based on the first request message, whether the second network element is authorized to request to perform the first operation on the first terminal device, wherein the determining comprises:

obtaining, by the first network element, a first identifier associated with the first terminal device from the first request message; and determining, by the first network element, whether a third identifier associated with the first identifier is the same as a fourth identifier that is associated with the second network element and the security link, wherein the fourth identifier is obtained during establishment of the security link or after establishment of the security link.

11. The apparatus of claim 10, wherein the first operation comprises authentication and authorization revocation or pairing authentication and authorization revocation.

12. The apparatus of claim 11, wherein the operations further comprise:

before the receiving the first request message from the second network element, performing, a second operation on the first terminal device, wherein the second operation is authentication and authorization.

13. The apparatus of claim 10, wherein determining whether the third identifier associated with the first identifier is the same as the fourth identifier comprises: determining the third identifier based on the first identifier and a mapping between the third identifier and the first identifier.

14. The apparatus of claim 10, wherein the forth identifier comprises an identity identifier of the second network element; and the first identifier comprises an identity identifier of the first terminal device.

15. The apparatus of claim 10, wherein the first network element is an uncrewed aerial vehicle network function, the second network element is an uncrewed aerial system traffic management network function or an unmanned aerial system service supplier, and the first terminal device is an uncrewed aerial vehicle.

16. The apparatus of claim 10, wherein the apparatus is further caused to perform:

determining the third identifier based on the first identifier and a mapping between the third identifier and the first identifier, wherein the third identifier is an identity identifier of a third network element, and the mapping indicates that the third network element is authorized to perform the first operation on the first terminal device.

17. The apparatus of claim 16, wherein the apparatus is further caused to perform:

storing the mapping in or after an uncrewed aerial vehicle registration procedure or an uncrewed aerial vehicle authentication and authorization procedure.

18. The apparatus of claim 10, wherein the apparatus is further caused to perform:

when the first network element determines that the third identifier is the same as the fourth identifier, performing, by the first network element, the first operation; or when the first network element determines that the third identifier is different from the fourth identifier, terminating, by the first network element, the first operation.

19. A non-transitory computer-readable storage medium storing instructions that, when executed, cause a processor to perform:

receiving a first request message from a second network element through a security link between the first network element and the second network element, wherein the first request message is used to request to perform a first operation on a first terminal device; and determining, based on the first request message, whether the second network element is authorized to request to perform the first operation on the first terminal device, wherein the determining comprises:

obtaining a first identifier associated with the first terminal device from the first request message; and determining whether a third identifier associated with the first identifier is the same as a fourth identifier that is associated with the second network element and the security link, wherein the fourth identifier is obtained during establishment of the security link or after establishment of the security link.

20. The non-transitory computer-readable storage medium of claim 19, wherein the forth identifier comprises an identity identifier of the second network element; and the first identifier comprises an identity identifier of the first terminal device.

\* \* \* \* \*